(12) United States Patent
Rosales et al.

(10) Patent No.: US 8,473,692 B2
(45) Date of Patent: Jun. 25, 2013

(54) OPERATING SYSTEM IMAGE MANAGEMENT

(75) Inventors: Jacob Jason Rosales, Austin, TX (US); Morgan Jeffrey Rosas, Cedar Park, TX (US); Basu Vaidyanathan, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 12/913,017

(22) Filed: Oct. 27, 2010

(65) Prior Publication Data

US 2012/0110274 A1    May 3, 2012

(51) Int. Cl.
*G06F 13/00* (2006.01)
*G06F 13/28* (2006.01)

(52) U.S. Cl.
USPC ......... 711/153; 711/E12.002; 718/1; 718/108

(58) Field of Classification Search
USPC ........................ 711/153, E12.002; 718/1, 108
See application file for complete search history.

(56) References Cited

U.S. PATENT DOCUMENTS

| | | |
|---|---|---|
| 2006/0123024 A1 | 6/2006 | Sathyanarayan |
| 2008/0155243 A1 | 6/2008 | Diep |
| 2008/0189468 A1 | 8/2008 | Schmidt |
| 2009/0007100 A1* | 1/2009 | Field et al. .................. 718/1 |
| 2009/0113423 A1* | 4/2009 | Hiltgen et al. ............... 718/1 |
| 2011/0231844 A1* | 9/2011 | Ben-Shaul et al. .......... 718/1 |
| 2012/0089972 A1* | 4/2012 | Scheidel et al. ............ 717/168 |

* cited by examiner

*Primary Examiner* — Edward Dudek, Jr.
(74) *Attorney, Agent, or Firm* — Yudell Isidore Ng Russell PLLC

(57) ABSTRACT

In a data processing system including multiple logical partitions (LPARs), an application executes on a first logical partition (LPAR) of the multiple LPARs, where the application uses a first operation system stored in a first memory partition of a shared pool memory of the data processing system. A virtualization management component (a) initiates an update process that quiesces operations of the first LPAR, (b) pages in, via a virtual input/output server coupled to a first paging device, a first image of a second operating system from the first paging device to the shared pool memory; (c) changes one or more pointers associated with the application to point to one or more portions of the second operating system, such that the application uses the second operating system, when resumed; and (b) resumes execution the application.

20 Claims, 15 Drawing Sheets

OPERATING SYSTEM IMAGE MANAGEMENT

BACKGROUND

1. Technical Field

The present invention relates in general to distributed data processing systems and in particular to operating systems within distributed data processing systems associated with virtual input/output servers and client logical partitions. Still more particularly, the present invention relates to a method, data processing system and computer program product that creates and/or replaces operating systems within one or more client logical partitions of distributed data processing systems.

2. Description of the Related Art

Virtualized data processing system configuration, which provides the virtualization of processor, memory and operating system (OS) resources are becoming more and more common in the computer (and particularly the computer server) industry. To a lesser extent, storage virtualization is also known and provided in various environments. However, within the virtualization computing environment, storage virtualization and management is implemented as a separate virtualization model from server virtualization and management. As such, different client logical partitions (LPARs) associated with different virtualized server systems may execute one or more operating systems that need to be upgraded and/or replaced. In the past however, each client LPARs are shutdown, the OS of the client logical partition (LPAR) is upgraded or replaced, and the client LPAR is booted or started after the OS of the client LPAR is upgraded or replaced.

BRIEF SUMMARY

Disclosed are a method, data processing system, and a computer program product that creates an operating system (OS) image and replaces an existing OS on one or more logical partitions (LPARs), according to one or more embodiments. For example, in a data processing system including multiple LPARs, an application executes on a first logical partition (LPAR) of the multiple LPARs, where the application uses a first operation system stored in a first memory partition of a shared pool memory of the data processing system. In one embodiment, a virtualization management component or hypervisor: initiates an update process that quiesces operations of the first LPAR; pages in, via a virtual input/output server (VIOS) coupled to a first paging device, a first image of a second operating system from the first paging device to the shared pool memory; changes one or more pointers associated with the application to point to one or more portions of the second operating system such that the application uses the second operating system, when resumed; and resumes execution the application.

In another embodiment, the virtualization management component or hypervisor: creates a second logical partition of the multiple LPARs; loads the second operating system into a second memory partition of the shared pool memory such that the second logical partition uses the second memory partition as a second memory of the second logical partition; pages out, via the VIOS coupled to a second paging device of the plurality of paging devices, a second image of the second operating system; and produces the first image of the second operating system by copying one or more of metadata and data associated with the second operating system to the first image. In one embodiment, the first paging device and the second paging device are associated with respective files in a file system, and the VIOS provides the file, via a virtual SCSI device, to the virtualization management component or hypervisor as the first paging device and the second paging device. According to another embodiment, a third OS can be produced such that the third OS that includes the first image of the second operating system, first metadata changes, and first data changes differing from the first image of the second operating system that are specific to a second logical partition.

In one or more embodiments, a method, data processing system, and a computer program product establishes cluster-awareness for a VIOS created within an OS partition of a computing electronic complex within the data processing system. One embodiment provides a computing electronic complex (CEC) comprising: a processor; one or more physical input/output (I/O) adapters that support I/O communication with an external network; and a memory coupled to the one or more processors and having a virtualization management component that supports creation of and communication between one or more virtualized operating system (OS) partitions. The memory also includes at least one operating system (OS) partition, including a first virtual input/output (I/O) server (VIOS) partition having a cluster-aware (CA) OS that executes on a virtual processor resource of the VIOS. When executed the CA_OS performs the function of registering the first VIOS with a VIOS cluster comprising at least a second VIOS. The registering of the first VIOS to the VIOS cluster enables the first VIOS to receive cluster specific data to make the first VIOS aware of the VIOS cluster, and the first VIOS is thus able to communicate information with other VIOSes within the VIOS cluster.

According to one embodiment, registering of the first VIOS with the VIOS cluster comprises: initializing a cluster registration module that assigns the VIOS with a unique ID and forwards VIOS registration data to a shared VIOS database (DB); receiving, from the shared VIOS DB, cluster configuration data and status data of the VIOS cluster for local storage at the first VIOS; and updating a local storage of the first VIOS with the received cluster configuration data and status data.

In one embodiment, the CA_OS further performs the functions of: initializing an I/O emulation module of the CA_OS to enable the VIOS to provide virtual I/O (VIO) services to one or more client logical partitions (LPARs) existing within one of the OS partitions; registering a first client LPAR with the VIOS; assigning a unique VIO adapter to the client LPAR; and enabling I/O operations for the client LPAR by linking the unique VIO adapter to one of the one or more physical I/O adapters.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein.

DETAILED DESCRIPTION

Figure 1:
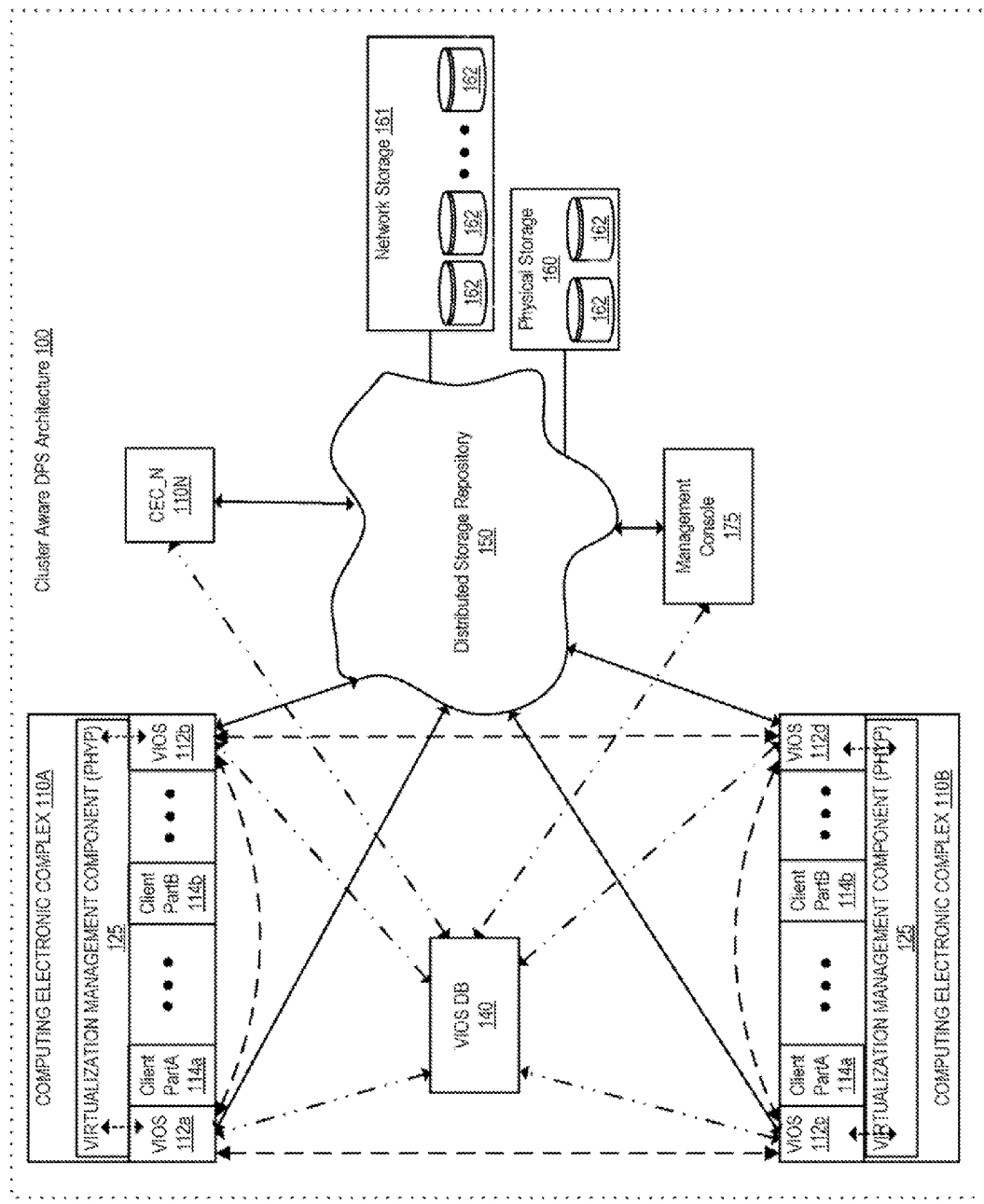
FIG. 1 illustrates a first view of a cluster (aware) data processing system within which various of the functional features of the described embodiments are implemented, according to one embodiment.

The illustrative embodiments provide a method, data processing system, and computer program product that efficiently creates an operating system (OS) image and replaces an existing OS on one or more logical partitions (LPARs) According to the method, which is executed within a data processing system that includes multiple logical partitions (LPARs) with at least one cluster aware Virtual Input/Output (I/O) Server (VIOS), an application executes on a first logical partition (LPAR) of the multiple LPARs, where the application uses a first operation system stored in a first memory partition of a shared pool memory of the data processing system. A virtualization management component (a) initiates an update process that quiesces operations of the first LPAR, (b) pages in, via a virtual input/output server coupled to a first paging device, a first image of a second operating system from the first paging device to the shared pool memory; (c) changes one or more pointers associated with the application to point to one or more portions of the second operating system, such that the application uses the second operating system, when resumed; and (b) resumes execution the application.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized. For example, as utilized herein, the term cluster-aware refers to the operational state of each VIOS within the cluster where the VIOSes contain information about which other VIOSes are connected within the cluster, the configuration of the different CECs within the DPS supported by the cluster, information about which client LPARs are supported by each VIOS, and other state and operating information and data related to performing VIO operations using the physical I/O devices of the DPS and those of the distributed storage repository (storage repository). Cluster awareness is supported by both a shared, networked VIOS database and locally maintained copies of VIOS cluster data within each VIOS.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and subheadings are presented within the specification:

A. General Architecture
   B. Cluster-Aware VIOS
   C. VIOS API Communication Infrastructure
   D. VIOS Shared DB for Cluster Management
   F. VIOS Creation and Registration with VIOS Cluster
   G. Operating System Image Management

A. General Architecture

With specific reference now to FIG. 1, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. Also supported within each CEC 110A-110B are client logical partitions (interchangeably referred to as client LPARs or "clients"), of which a first two clients, clientA 114a and clientB 114b, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed storage repository 150, and the distributed storage repository 150 enables several of the client level functional features provided by the embodiments described herein. Distributed storage repository 150 provides a single view of storage that is utilized by each CEC 110 and for each client 114 of each CEC 110 within a cluster-aware, distributed system. Distributed storage repository 150 comprises local physical storage 160 and network storage 161, both of which comprise multiple physical storage units 162 (e.g., disks. solid state drives, etc.). The physical disks making up distributed storage repository 150 may be distributed across a storage network (e.g., a SAN). Additionally, distributed storage repository 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed storage repository 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed storage repository 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to distributed storage repository 150 via VIOS-to-Store or CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112a) of a first CEC to a second VIOS (e.g., VIOS 112b) on the same CEC, the various interconnects represent a network level connectivity between the VIOS nodes of the cluster and the DB 140 and the distributed storage repository 150. As utilized herein, references to one or more "nodes", are assumed to refer specifically to a VIOS within the cluster. DPS 100 also comprises a management console 175 on which a management tool (not shown) executes.

Figure 3:
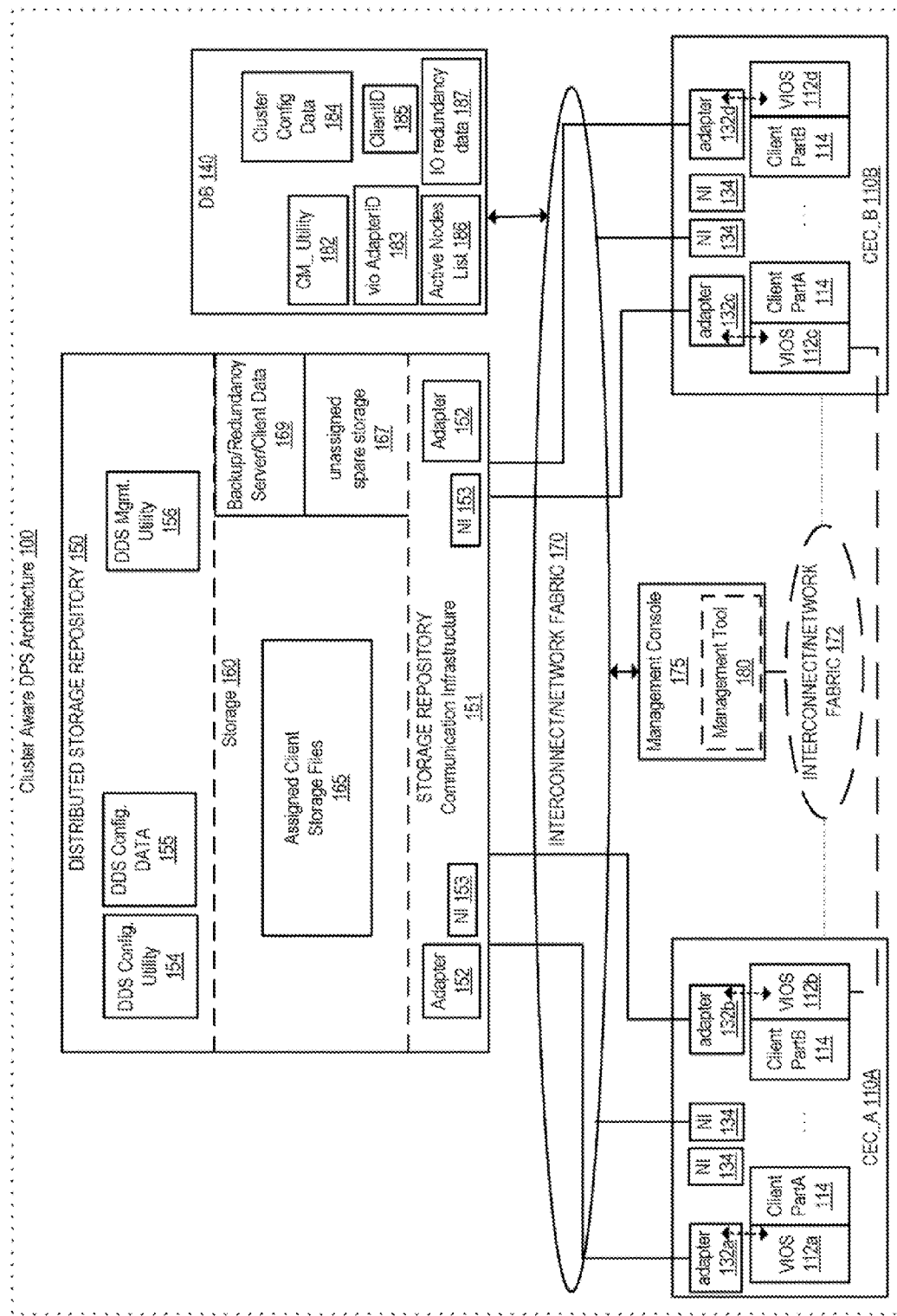
FIG. 3 illustrates a second view of the cluster data processing system (DPS) of FIG. 1A depicting additional functional components within the computing complexes and shared storage, according to one embodiment.

Turning now to FIG. 3, there is illustrated another view of DPS 100 illustrating the network-based connection of the CECs 110 to the distributed storage repository 150 and DB 140. FIG. 3 illustrates in greater detail the network connectivity of VIOSes and CECs to each other and to Distributed storage repository 150. With this view, CEC_A (Node_A) 110A and CEC_B (Node_B) 110B comprise similar constructs as presented in FIG. 1. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 3), such as a local area network (LAN).

Also illustrated by FIG. 3 is an initial view of the component make-up of an example distributed storage repository 150 and an initial listing of some components of DB 140. As depicted, each CEC 110 comprises one or more network interfaces 134 and one or more I/O adapters 132 to enable the CEC 110 and thus the other components (i.e., client partitions) of the CEC 110 to engage in network level communication, as described below. Specifically, each VIOS 112 emulates virtual client I/O adapters to enable communication by the client LPARs 114 with distributed storage repository 150 and/or other clients, within the same CEC or on a different CEC. The VIOSes 112 emulate virtual I/O adapters and communicates with distributed storage repository 150 by connecting with corresponding virtual sever I/O adapters at distributed storage repository 150. The VIOSes 112 within each CEC 110 are thus able to support client level access to distributed storage 150 and enable the exchange of system level and client level information with distributed storage repository 150.

In addition, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to DB 140 via network 170 and communicates cluster-level data with DB 140 to support the cluster management functions described herein.

To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual sever I/O adapters, which are paired with virtual I/O adapters (132) that are assigned to clients 114 of CECs 110.

As shown with FIG. 1B, distributed storage repository (DSR) 150 also comprises a plurality of software, firmware and/or software utility components, including DSR configuration utility 154, DSR configuration data 155 (e.g., inodes for basic file system access, metadata, authentication and other processes), and DSR management utility 156.

To support the cluster awareness features of the DPS 100, and in accordance with the illustrative embodiment, distributed storage repository 150 also comprises VIOS database (DB) 140, in which is stored various data structures generated during set up and/or subsequent processing of the VIOS cluster-connected processing components (e.g., VIOSes and management tool). DB 140 comprises a plurality of software or firmware components and/or and data, data modules or data structures, several of which are presented in FIG. 3, for illustration. Among these components are cluster management (CM) utility 182, VIO AdapterID data structure 183, cluster configuration data 184, Client identifying (ID) data 185, active nodes list 186, and I/O redundancy data 187, among others. These various components support the various clustering functionality and cluster-aware I/O operations of the one or more VIOSes 112, as described herein. Additional features of DB 140 and distributed storage repository 150 as well as the specific components or sub-components that enable the various clustering functionality are presented within the description of the remaining figures and throughout the description of the various embodiments.

These various data structures are created, maintained and/or updated, and/or deleted by the various operations of one or more of the processing components. In one embodiment, the initial set up of the storage pools, VIOS DB 240 and corresponding data structures is activated by execution of a cluster aware operating system by management tool 180. Once the infrastructure has been established, however, maintenance of the infrastructure, including expanding the number of nodes, where required, is performed by the VIOSes in communication with DB 140 and the management tool 180.

Also associated with DPS 100 and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 3 and described throughout the specification, management tool 180 is implemented within management console 175. However, it is appreciated that (resources of) any node within DPS 100 may be selected/elected to perform the functions of management tool 180, and the selected node would then perform one or more of the below described cluster creation and the other cluster monitoring and management functions, utilizing the availability of the resources provided by DB 140 and distributed storage repository 150.

In an alternate embodiment, management tool 180 is an executable module that is executed within a client partition at one of the CECs within DPS 100. In one embodiment, the management tool 180 controls the operations of the cluster and enables each node within the cluster to maintain current/updated information regarding the cluster, including providing notification of any changes made to one or more of the nodes within the cluster.

Figure 2:
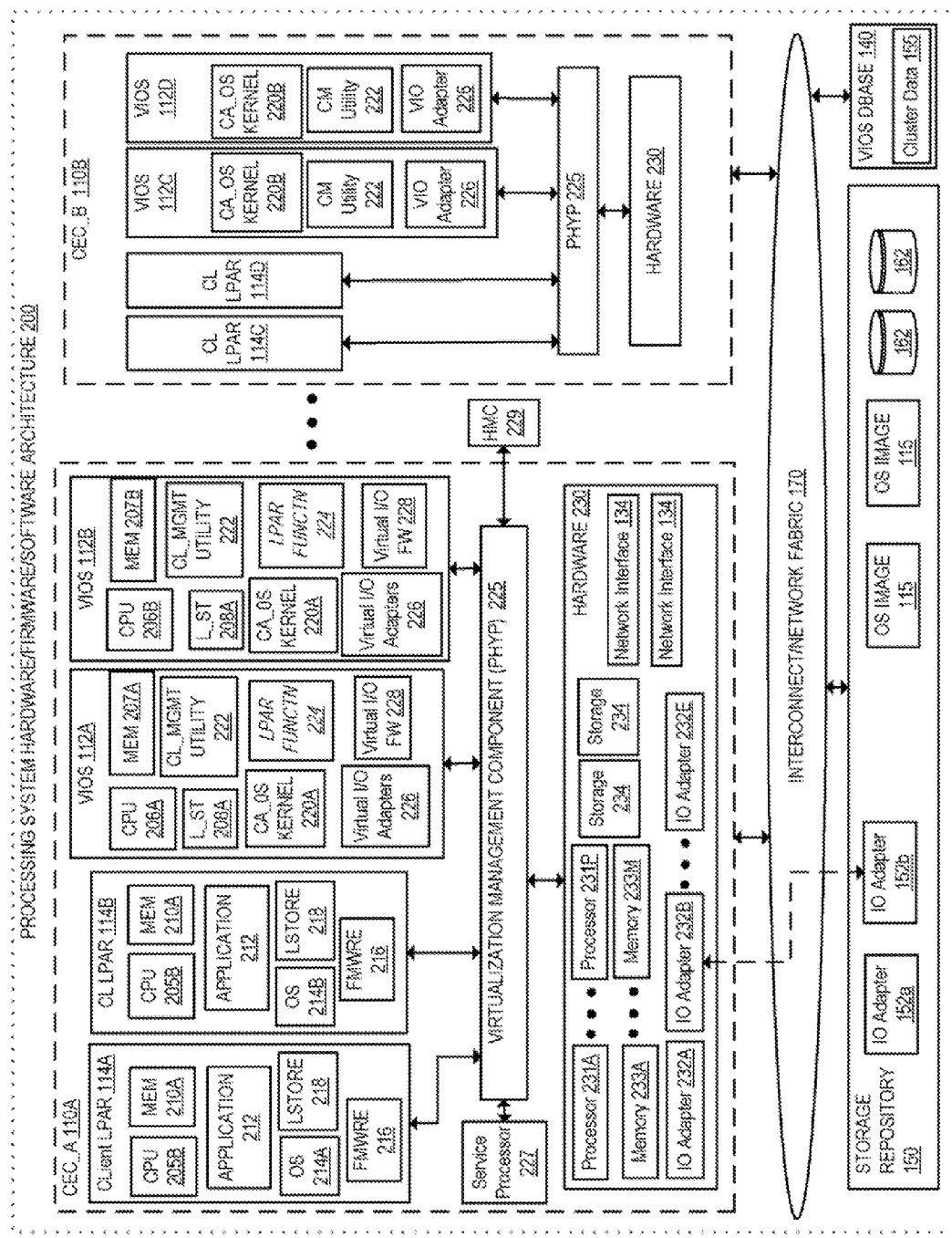
FIG. 2 illustrates an internal configuration of a computing electronic complex (CEC) within the cluster DPS having virtualized OS partitions, including virtual I/O server (VIOS) partitions, according to one embodiment.

With reference now to FIG. 2, there is presented a third view of an example DPS 100, emphasizing a processing system architecture 200 (i.e., architecture of the individual CECs, and specifically CEC_A 110A). CEC_A 110A (CEC 110A) serves as the example CEC that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. Operations of the different logical partitions may be controlled through HMC 229, which is a separate data processing system from which a system administrator may perform various functions, such as reallocation of resources to different logical partitions.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (SCSI) target and shared network adapter capability to client LPARs 114 within CEC 110. As provided herein, VIOS 112 supports Virtual real memory and Virtual shared storage functionality (with access to Distributed storage repository 150) as well as clustering functionality.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1, 2 and 3 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1, 2 and 3) are introduced above with reference to the description of the previous figures, and particularly FIG. 3. Descriptions of the specific functionality of the VIOS 112 will continue to be provided with reference to the illustrations of FIGS. 1, 2 and 3. As presented by FIG. 2, each VIOS 112 is a virtual machine instance that emulates hardware in a virtualized environment. The VIOS 112 is tasked with emulating SCSI storage devices, and the VIOS 112 provides client LPARs 114 with access to distributed storage repository 150 in cooperation with the PHYP 225. Configuration of the VIOS 112 is performed through the hardware management tools of HMC 229. SCSI storage devices support a set of commands that allow SCSI initiators the ability to control access to storage (150). Database programs, for example, may manage access to distributed storage repository 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking These I/O resources may be presented as internal or external SCSI or SCSI with RAID adapters or via Fibre-Channel adapters to distributed storage repository 150. The client LPAR 114, however, uses the virtual SCSI device drivers. In one embodiment, the VIOS 112 also provides disk virtualization for the client LPAR by creating a corresponding file on distributed storage repository 150 for each virtual disk. The VIOS 112 allows more efficient utilization of physical resources through sharing between client LPARs, and supports a single machine (e.g., CEC 110) to run multiple operating system (OS) images concurrently and isolated from each other.

In one or more embodiments, the VIOS operating system(s) is an enhanced OS that includes cluster-aware functionality and is thus referred to as a cluster aware OS (CA_OS). One embodiment, for example, utilizes cluster aware AIX (CAA) as the operating system. According to one embodiment, cluster-awareness enables multiple independent physical systems to be operated and managed as a single system. As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. When executed within two or more nodes of DPS, CA_OS 220 enables various clustering functions, such as forming a cluster, adding members to a cluster, and removing members from a cluster, as described in greater detail below. CA_OS 220 manages the VIOS LPARs 112 and enables the VIOSes within a cluster to be cluster aware. CA_OS 220 comprises several functional modules. In the described embodiments, CA_OS 220 comprises cluster management (CM) utility 222 which supports the configuration of the VIOS to enable cluster-awareness and cluster-level functionality, such as redundant virtual I/O. Each of these additional software components of CA_OS 220 may be a functional module within CM utility, in one embodiment, and each module is thus described as such throughout the remainder of this specification. In one embodiment, CM utility 222 may be a separate utility that is locally installed or downloaded (from DB 140, for example) as an enhancement to an existing OS within a CEC 110 or VIOS 112, when initially configured for operation within the VIOS cluster. CM utility 222 is then executed when configuring the individual VIOS to create or join a cluster and/or become a cluster-aware node within the VIOS cluster. With this implementation structure, CM utility 222 enables the OS to support the various cluster-awareness and other cluster-level features and functionality. In an alternate embodiment, CA_OS 220 includes all the clustering features and functionality and established the various features when the CEC 110/VIOS 112 joins the cluster and/or during configuration of VIOS 112 to become cluster-aware.

In one implementation, functional components of CM utility 222 are encoded on local device storage of a corresponding VIOS 112, such that the VIOS 112 becomes automatically configured as a part of the VIOS cluster when the VIOS 112 is initially activated. On initial set up of the VIOS, VIOS API, kernel extensions and virtual adapters are configured within VIOS to enable communication with the other VIOSes, the VIOS DB 140, and with the distributed storage repository 150. During this initial setup of the VIOS 112, the VIOS executes a registration module of CM utility 222 to register VIOS 112 with the cluster. The registration module enables VIOS 112 to retrieve/download or have forwarded from DB 140 (on successful registration with the cluster) any additional CM software components and/or cluster-level information and/or data required to establish full cluster awareness when the VIOS has completed installation and is activated within the CEC 110. Thus, in one embodiment, in addition to the locally stored CA_OS components and software modules of CM utility 222, other functional components of CM utility 222 may be downloaded from DB 140 when CEC is powered on or when one or more VIOSes 112 are enabled on CEC 110. Once the VIOS 112 has completed its setup, one or more client LPARs 114 that are activated within CEC 110 may be assigned to VIOS 112, and VIOS 112 subsequently performs the various I/O operations initiated by the client 114 (as initiator) or directed to the client 114 (as target). Updates to the local VIOS data may periodically be made as changes are made within the VIOS cluster and/or as one or more new client LPARs 114 are added to the CEC 110 requiring VIOS support. In one embodiment, CM utility 222 may also enable retrieval and presentation of a comprehensive view of the resources of the entire cluster.

It is appreciated that while various functional aspects of the clustering operations are described as separate components, modules, and/or utility and associated data constructs, the entire grouping of different components/utility/data may be provided by a single executable utility/application, such as CA_OS 220 or CM utility 222. Thus, in one embodiment, CA_OS 220 executes within VIOS 112 and generates a plurality of functional components within VIOS 112 and within DB 140. Several of these functional components are introduced within FIG. 3 and FIG. 2 and others are described throughout the various embodiments provided herein. For simplicity in the descriptions which follow, references to CM utility 222 and CA_OS 220 will be assumed to be referring to the same general component (i.e., CM utility 222 being a subcomponent of CA_OS 220), and the terms may be utilized interchangeably throughout the specification.

As further presented by the illustrative embodiments (e.g., FIG. 2), VIOS 112 includes one or more additional functional modules/components, such as VIO adapter(s) (interface) 226, and virtual I/O drivers/utility 228, which provides I/O functionality to VIOS 112 and enables VIOS 112 to route data traffic to and from data structures and storage within distributed storage repository 150 and/or DB 140. Virtual I/O adapter(s) 226 and CM utility 222 also enable the VIOS 112 to provide each client LPAR 114 with access to the full range of storage accessible within distributed storage repository 150 and other cluster-supported functionalities, as described herein.

In the illustrative embodiment, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

With the above introduced system configuration of FIGS. 1, 2 and 3, a first VIOS 112*a* (through a communication channel established via PHYP 225), grants access to another VIOS 112*b* through one or more virtual adapters. VIOS 112 includes the functionality to query PHYP 225 for the identity of the Client LPAR 114 on the CEC 110 where the VIOS 112 is currently running.

With the cluster aware VIOS infrastructure, different VIOSes 112 associated with different CECs 110 access the distributed storage repository 150 and cluster-level information is shared/communicated across the VIOS cluster (via VIOS DB 140) while each client I/O process is being performed. In this manner the VIOS associated with a first client on a first CEC is aware of which SAN disk resources are being accessed by a second client on a second CEC (or on the same CEC). With this awareness factored into the I/O exchange with the distributed storage repository 150, the VIOS associated with the first client can avoid accessing the same storage resource that is concurrently being utilized by the second client, thus preventing data integrity issues, which could potentially cause data corruption and client partition crashes.

Figure 5:
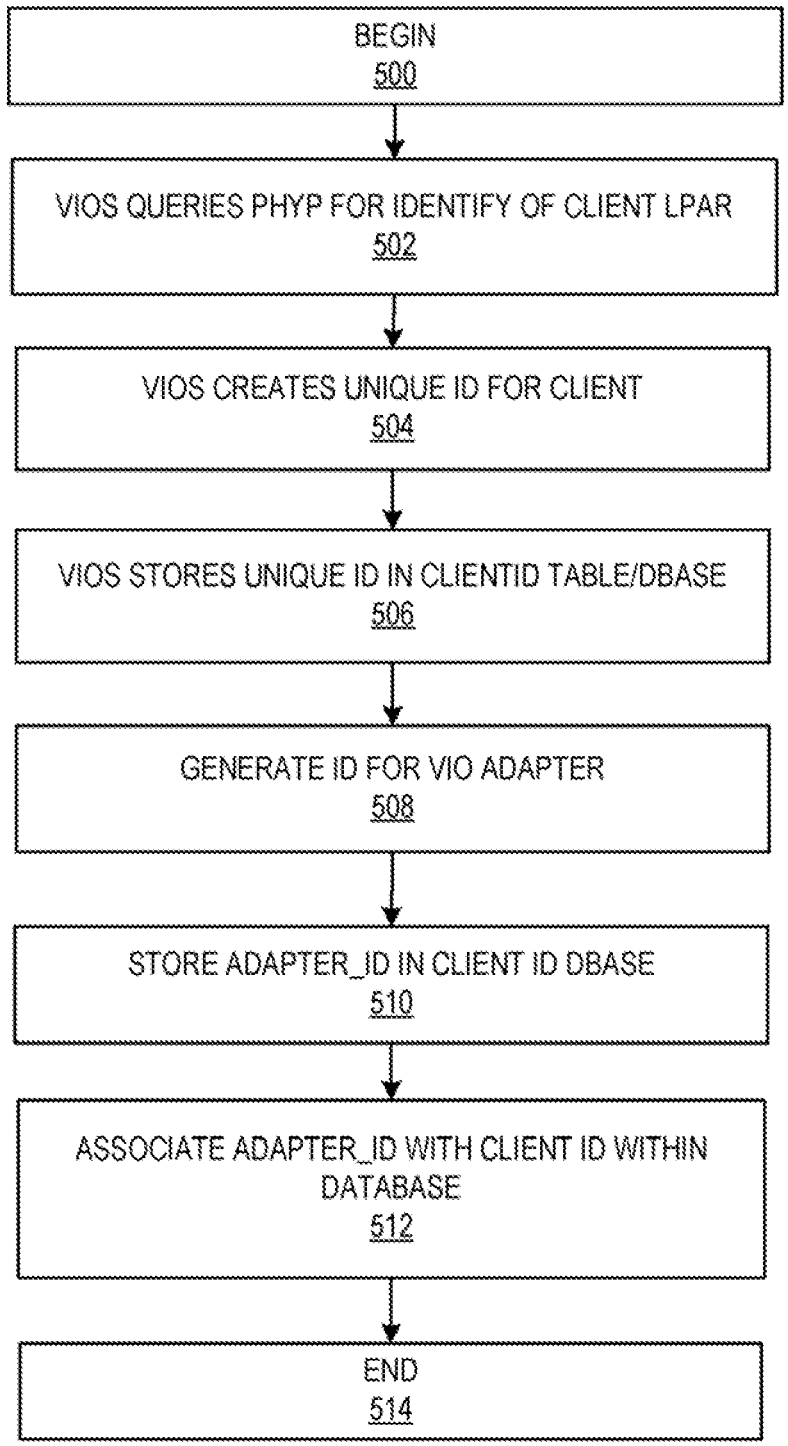
FIG. 5 is a flow chart of the method by which the process of client creation and registration is completed within a CA_DPS, according to one embodiment.

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client. FIG. 5 is a flow chart illustrating the method by which a VIOS 112 on a CEC 110 with DPS 100 enables cluster level communication between a client LPAR 114 and distributed storage repository 150, according to one embodiment. The process begins at block 500 and proceeds to block 502 at which the VIOS 112 queries PHYP 225 for the identity of the client LPAR 114. At block 504, the VIOS 112 creates a unique identifier (ID) for the client (i.e., a ClientID). The VIOS 112 then stores the unique ClientID in ClientID data structure 159 (FIG. 1B) within DB 140 (block 506). The DB 140 and by extension the ClientID data structure 159 are accessible to each VIOS partition in the cooperating cluster (DPS 100). At block 508, the VIOS 112 also generates an identifier for each virtual IT nexus (virtual I/O AdapterID) that is utilized for each virtual adapter assigned to the client LPAR 114. In one embodiment, a client LPAR 114 can have multiple virtual adapters assigned thereto. These vio AdapterIDs are stored in the AdapaterID data structure 158 (block 510) and are associated with their corresponding clientIDs (block 512). The method illustrated by FIG. 5 ends at termination block 514, with each clientID having been associated with the corresponding one or more vio AdapterIDs with DB 140.

As described herein, a cluster is a set of one or more networked VIOS partitions, where each VIOS within the cluster has access to a common set of physical volumes. The physical volume resides within the VIOS cluster and is utilized to provide block storage. Implementation of the cluster awareness with the VIOSes of the cluster enables the VIOSes to provide cluster storage services to virtual clients (client LPARs 114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition.

C. CA VIOS Communication Protocol

One embodiment provides a communication protocol that enables efficient communication between the Clients 114 and distributed storage repository 150 via the respective VIOS 112 and virtual I/O adapters assigned within the VIOSes 112 to the specific client 114. The embodiment further provides storage virtualization and management via the specific communication mechanisms/protocols implemented with respect to the use of cluster awareness and the Distributed storage repository 150 such that the virtualization is presented within the context of the server (CEC 110) virtualization and management. With the presented protocol, different VIOSes 112 associated with different CECs 110 access the same single distributed DB 140 and cluster-level information is shared/communicated with each Client I/O process such that a first client on a first CEC is aware of which SAN disk resources are being accessed by a second client on a second CEC (or on the same CEC). With this awareness factored into the I/O exchange with the distributed storage repository 150, the first client can avoid accessing the same storage resource that is concurrently being utilized by the second client, thus preventing data integrity issues, which would potentially cause data corruption and client partition crashes.

The communication protocol provides a highly integrated server-based storage virtualization, as well as distributed storage across clustered VIOS partitions. This protocol comprises one or more query features, which enables dynamic tracking of storage resource usage across the entire cluster. Throughout the following description, the communication and management protocol shall be described as a VIOS protocol. VIOS protocol provides distributed storage across clustered VIOS partitions. With the VIOS protocol, the storage is considered as a one large storage pool which chunks of storage (i.e., logical units or LUs) allocated to each client 114. The VIOSes within the overall system (DPS 100) are now structured as part of the cluster, with each VIOS being a node in the cluster. Each VIOS node communicates with other VIOS nodes utilizing the VIOS protocol. With this configuration of VIOSes, when two or more client LPARs 114 belonging to different CECs 110 share storage on the SAN (e.g., two clients assigned overlapping LUs), the VIOS protocol enables each node to query (each client within the cluster) to determine the current usage of the storage device. When this information is received, the VIOS may then disseminate this information to other VIOSes. Each client is thus made aware of whether the SAN storage device that the client is trying to access is currently being used by some other client.

Figure 4:
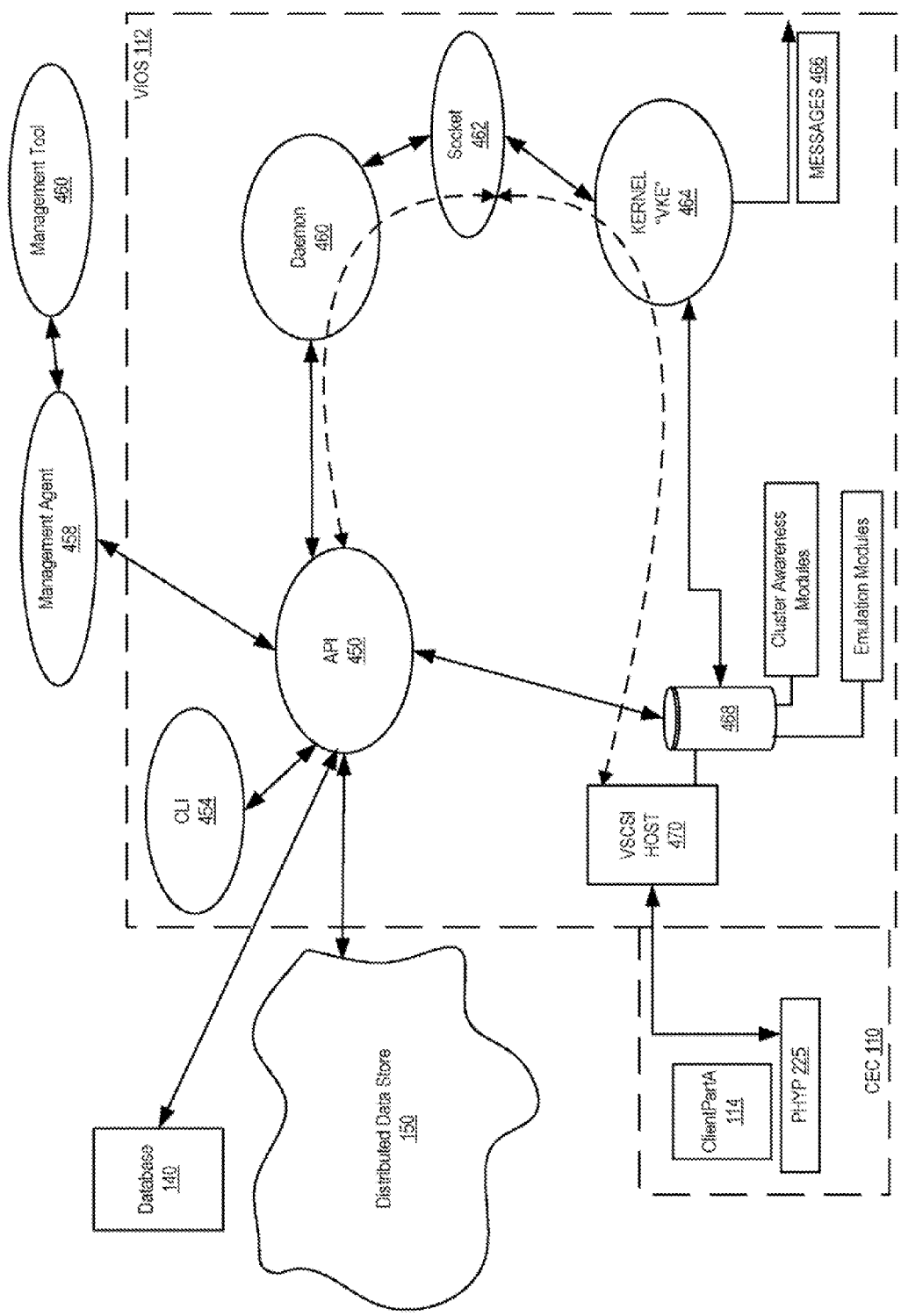
FIG. 4 illustrates a VIOS communication infrastructure with an application programming interface (API) controlling messaging and communication of VIOS components and other devices within the DPS, according to one embodiment.

Referring now to FIG. 4, there is illustrated an example VIOS communication infrastructure having an application programming interface (API) controlling the various exchanges between XML components over a virtual Small Computing Systems Interface (vSCSI) topology. Central to the Cluster/VIOS communication paradigm is a plurality of APIs, of which API 252 is provided in the illustrative embodiment. The VIOS API 450 is utilized to manage objects within a VIOS cluster. The API 450 includes the necessary information about how to connect to and/or exchange information with internal VIOS functional modules as well as with DB 140, DDS 150 and management tool 460. In one embodiment, management tool 260 is implemented within a cluster aware server module and includes server management sub-agents 258, which represents the structures utilized by the managing tool to communicate with the operating system. The internal functional modules within VIOS 112 comprises command line interface (CLI 454), Daemon 460, socket 462, kernel extension (vKE) 464, and vSCSI host 470. The vSCSCI host 470 includes the enhancements to VIOS 112 that enable the cluster aware functionality. These enhancements are illustrated as a connected block structure 468, by which advanced VIOS operations and emulation are provided, as described in greater detail below. VIOS 112 with its various internal components is connected within CEC 110 via PHYP 225, as previously illustrated by FIG. 2, described above.

Each component that connects with API 450 and makes one or more requests through API 450 is generally referred to as a "caller" throughout this specification. As presented by the figure, any one or management tool 460 (via management agent 458), CLI 454, Daemon 460, and vSCSI host 470 may be a caller requesting specific types of information exchange via API 450. In one embodiment, the API 450 comprises an XML interface as well as a C programming language interface. The various "callers" use the VIOS API 450 to initiate actions on these objects. Some actions may change the state of one or more objects in the VIOS cluster. The VIOS API 450 may be used by multiple callers at any given time. While callers are not aware of other callers using the VIOS API 450 and do not have the ability to notify all callers of actions that they initiate, the VIOS API event notification protocol provides cluster level awareness of caller modifications to prevent data contamination during processing of multiple caller requests. Callers that need awareness of actions taken on VIO objects are able to register for event notification and receive notification about changes to VIO objects that occur within the cluster. The callers then utilize the notifications as a trigger to go to the shared storage (DB 140) and retrieve the necessary information from the shared VIOS cluster DB 140 to keep the caller's locally stored VIO object data current. Additionally, in one embodiment, VIOS API event notification provides participating callers with results to actions that have occurred on one or more VIO objects. As described herein, these VIO object events are categorized as Lifecycle events or Alert events.

In one embodiment, to decrease the amount of APIs required be each consumer, only a few high level APIs are exposed. Each API provides various actions on an object by object basis. Interaction between the API 450 and a consumer (a caller receiving data in response to a requestor a caller registered to receive notification of an event) is performed by the consumer providing a VIO request extensible markup language (XML) buffer with sufficient amount of data provided in order for the request to be processed. Once the request has been processed, a VIO response XML steam is written back to the caller for response processing. When the response indicates a successful processing of the request, the XML steam contains the status and the requested object information that is needed. However, if the request fails, the response XML stream contains VIO exception information. The common format of each object API is to provide a vioRequest structure that contains the required information needed for request processing.

Returning to FIG. 4, in the illustrative embodiments, a VIOS 112 emulates SCSI devices using a kernel extension (vscsi host kernel extension kernel extension) in the VIOS partition (which also includes the code/modules for providing VCSI host 470 and Daemon 460). VSCSI host 470 includes one or more driver(s) and sub-driver(s), which provide separate functions. A first set of drivers provides emulation functionality, while other drivers provide transport and messaging functionality. VSCSI host 470 includes VIOS enhanced operational functionality, illustrated via additional structure4 coupled to VSCSI host 470. Structure 468 includes software modules that enable the various messaging structures used for implementing VIOS cluster awareness functionality and VIOS/Client emulation. Client 114*a* logs into the VIOS 112 as part of the transport layer protocol. At the time the client 114*a* logs into the VIOS 112, the PHYP 125 provides information to the VIOS 112 regarding the identity (ID) of the client 114*a* relative to the CEC 110. The VKE 264 services SCSI requests sent by the VIOS 112 through a transport layer supported by PHYP 225. The kernel code does not complete the login request until the VKE 464 sends a message with the CEC-relative client ID using a socket 462 to Daemon 460, which is also running on the VIOS 112. VKE 464 also transmits other messages 466 within the cluster environment. The user daemon 460 has access through API 450 to Database (DB) 140, which is maintained by all VIOS partitions servicing the client(s) within the cluster.

D. VIOS Shared DB for Cluster Management

As described herein, implementation of the cluster awareness with the VIOSes of the cluster enables the VIOSes to provide cluster storage services to virtual clients (114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition. When a virtual target device is removed, the local OS cache (local storage) data entries are deleted. Within the clustered environment, removal of any of the LUs is noticed to the other VIOSes. According to the described method, a distributed device repository and local repository cache are utilized to ensure the nodes within the cluster become device level synchronized from each node (VIOS) in the cluster.

According to one embodiment, information needed to configure a virtual target device (VTD) is stored in DB 140. This database (DB 140) can be accessed by all the nodes in the VIOS cluster, utilizing services provided by Cluster-Aware OS, such as but not limited to Cluster-Aware AIX (CAA). Additionally, certain small levels of cluster data are stored in a local database (ODM) (e.g., virtualized portions of storage 234, FIG. 2) on each node for the devices which exist on that node. This local storage is necessary in order for the processes running on the local node to be able to match the VIOS device with the correct information in the distributed database.

With information about each device being stored in the DB 140, operations on those devices can be performed from any VIOS node in the cluster, not just the node on which the device resides. When an operation on a device is performed on a "remote" (non-local) node (i.e. one other than the node where the device physically resides), the operation is able to make any changes to the device's information in the DB 140, as necessary. When corresponding changes are needed in the device's local database, the corresponding CM utility 222 enables the remote node to send a message (using cluster services) to the local node to notify the local node to make the required changes. Additionally, when a node in the cluster is booted up, or when the node rejoins the cluster after having been lost for any period of time, the node will autonomously reference the DB 140 in order to synchronize the data there with the local data of the node.

As an example, if an operation to delete a VIOS device from the local node is executed on a remote node, the operation will remove the information associated with that device from the DB 140, and send a message to the local node to tell the local node to remove the device from the local database. If the local node is down or not currently a part of the cluster, when the local node first boots up or rejoins the cluster, the local node will automatically access the DB 140, retrieve current data/information that indicates that the information for one of the local devices has been removed, and delete that device from the local database records.

E. VIOS Creation and Registration with VIOS Cluster

Figure 6:
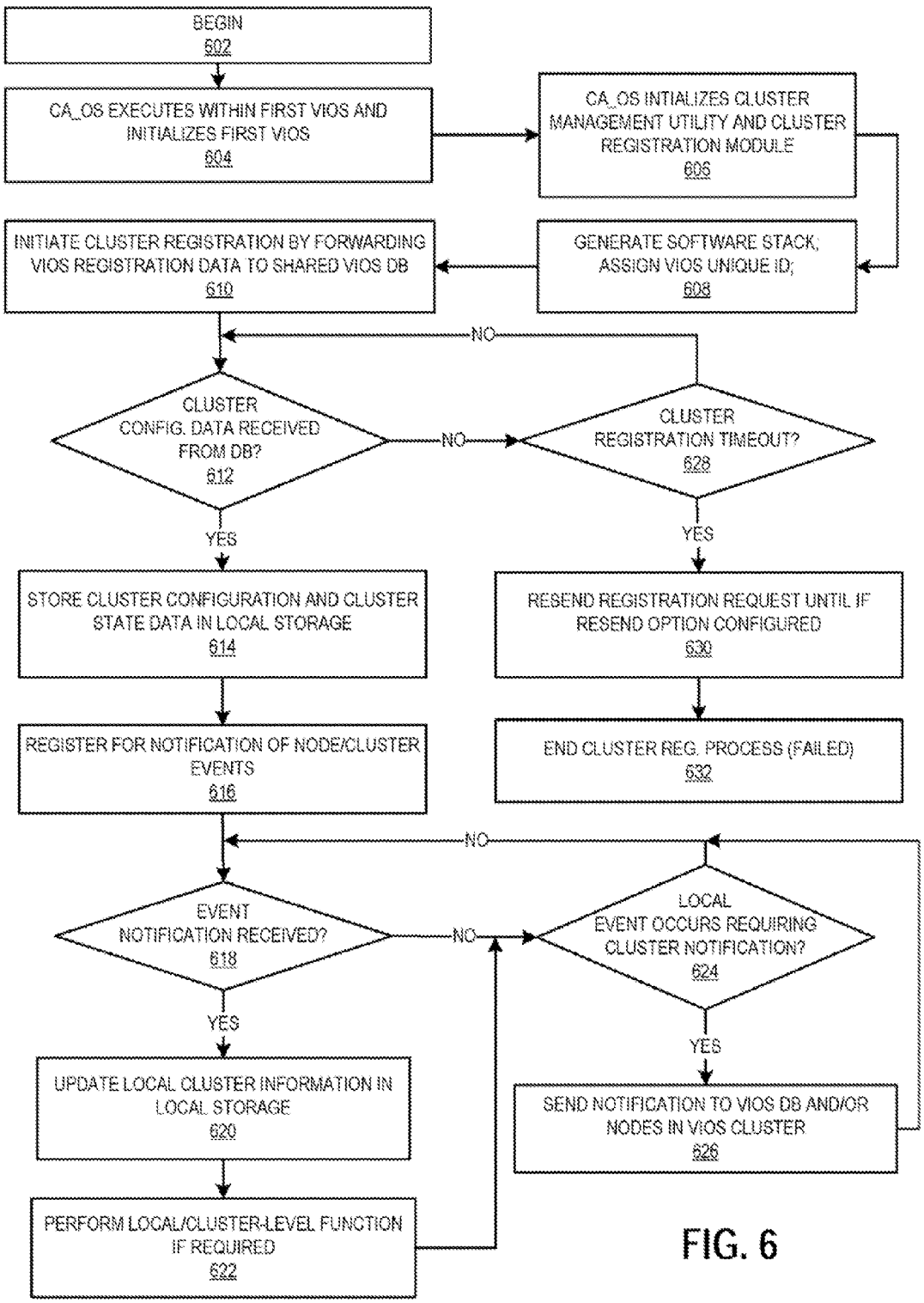
FIG. 6 is an example high-level logical flowchart illustrating the method of creating a cluster-aware VIOS and registering the cluster-aware VIOS with the VIOS cluster, according to one or more embodiments.
Figure 7:
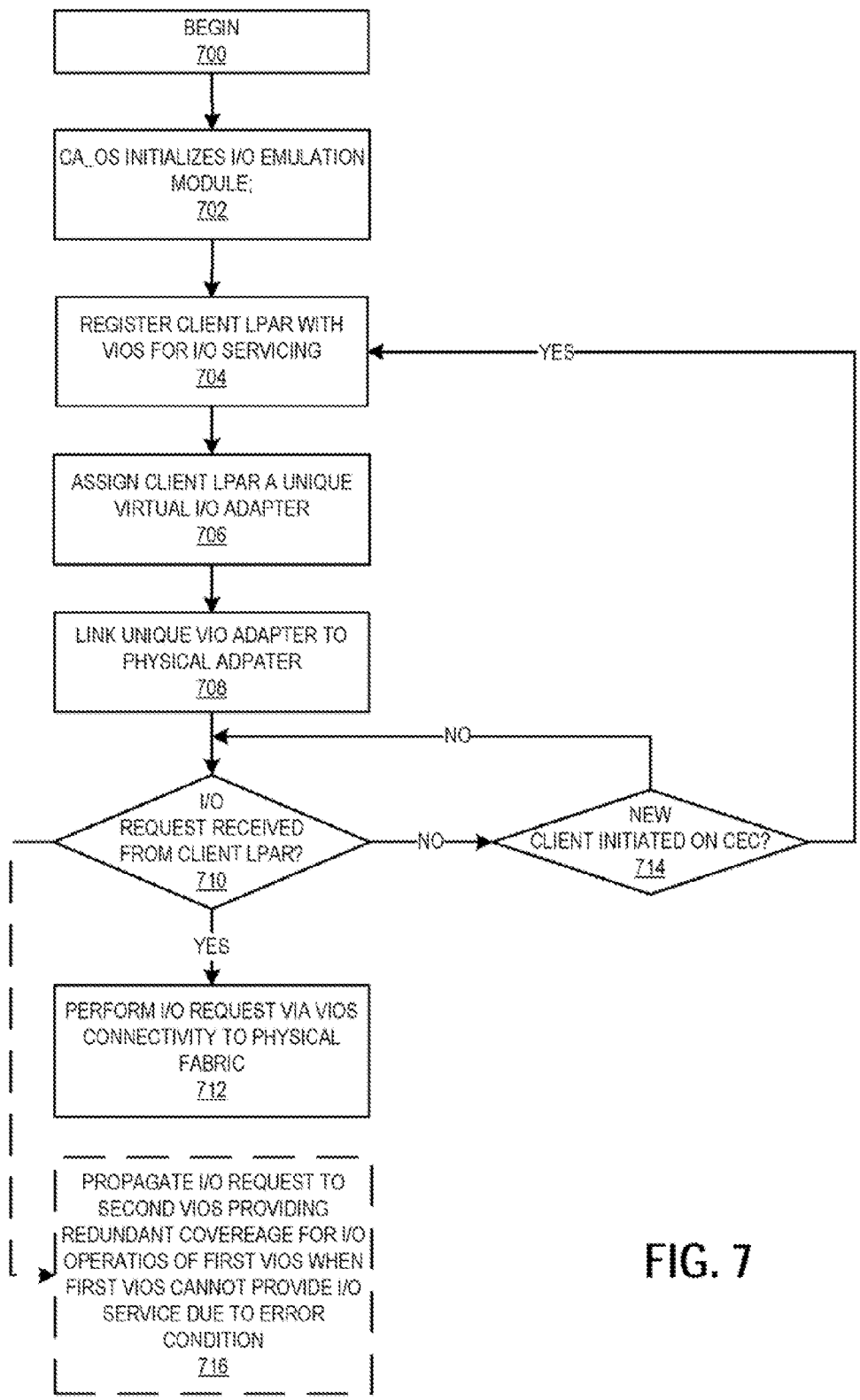
FIG. 7 is a high-level logical flowchart of an exemplary method by which several functional aspects of a cluster-aware VIOS are provided, according to one or more embodiments.

FIGS. 6 and 7 are flow charts illustrating one or more methods by which the above introduced processes of the illustrative embodiments are completed. Although the methods illustrated by FIGS. 6 and 7 may be described with reference to components and functionality illustrated by and described in reference to FIGS. 1-5, it should be understood that this is merely for convenience and alternative components and/or configurations thereof can be employed when implementing the various methods. Certain portions of the methods may be completed by CA_OS 220 and/or CM utility 222 executing on one or more (virtual) processors (CPU 206A) within VIOS 112 (FIG. 1 or 2). The executed processes then control specific operations of or on CECs 110, VIOSes 112, and DB 140 (and distributed storage repository 150, in some embodiments) For simplicity in describing the methods, all method processes are described from the perspective of CA_OS 220, CM utility 222 and/or CA_VIOS 112.

Referring now to FIG. 6, there is illustrated a high level logical flowchart of the method by which a fabric loss condition for a VIOS I/O operation is handled within the cluster-aware VIOS infrastructure. The method begins at block 602 and proceeds to block 604 at which a cluster aware (CA) operating system (OS) executing on a processor resource within the first VIOS partition initializes the first VIOS for VIO functionality. At block 606, the CA_OS initializes the cluster management utility and the cluster registration utility. CA_OS generates a software stack and assigns a unique ID to the VIOS (block 608). CA-OS 220 (or CM utility 222) initiates registration of the VIOS with the VIOS forwarding VIOS registration data to the shared VIOS DB 140 (block 610). Registration with the VIOS DB 140 triggers the VIOS DB to return cluster configuration information and enables the first VIOS to receive cluster specific data to make the first VIOS aware of the VIOS cluster. Once the first VIOS receives the information, the first VIOS is made cluster-aware and is able to communicate information with other VIOSes within the VIOS cluster. At decision block 612, CA_OS determines whether the cluster configuration data and cluster state/status data have been received from the VIOS DB 140. When the cluster data is not received within a pre-established timeout period (as determined at decision block 628), the registration information is resent (block 630) and the initial registration process ends with an initial failure (block 632). The CA_OS waits until the timeout period expires before resending the registration request, and the number of registration retries is a design parameter that is variable.

Returning to decision block 612, in response to receiving the configuration data from the VIOS DB, the CA_OS stores the cluster configuration and cluster state/status data within a local storage of the first VIOS (block 614). CM utility 222 then registers VIOS with the VIOS DB for one or more event notifications (of cluster events and/or other node events) (block 616). When cluster (or other node) event notifications are received by VIOS, as determined at block 618, the CM utility 220 updates the local cluster information within the local storage of the VIOS with relevant changes to the cluster information (block 620). The CM utility 222 then initiates performance of any responsive cluster level functions based on the received event notifications (block 622). As an example, in one embodiment, when the notification indicates that the primary node of the cluster has relegated from its primary node position, the CM utility 222 may initiate a primary node election module which performs the primary node election process with the other nodes in the VIOS cluster. When a local event occurs at the first node that requires cluster notification, as determined at decision block 624, CM utility 222 sends a notification of the local event to the VIOS cluster (i.e., to the VIOS DB and/or to the other nodes within the VIOS cluster) (block 626).

Turning now to FIG. 7, there is illustrated the method by which various ones of the I/O functions of the CA VIOS are implemented. The method begins at block 700 and proceeds to block 702 at which CA_OS initializes the I/O emulation module of the first VIOS. The I/O emulation module enables the VIOS to provide virtual I/O (VIO) services to one or more client logical partitions (LPARs) existing within one or more of the OS partitions within the CEC. The client LPAR is registered with the VIOS (block 704) and is assigned a unique VIO adapter for I/O processing (block 706). The CA_OS then links the unique VIO adapter to a physical adapter (block 708). In one or more embodiments, this linking actually only occurs at the time the VOS processes an I/O request from the client LPAR. When an I/O request is received from the client LPAR as determined at decision block 710, the I/O request is processed by the VIOS utilizing the VIO adapter and connectivity via the physical I/O adapters to the connecting fabric (block 712). As provided at decision block 714, if a new client LPAR is initiated on the CEC and requires VIO services from the VIOS, the process of registering a client to the VIOS is repeated for the new client LPAR. As also indicated by the dashed (optional) block 716, the CA_OS also enables the VIOS to propagate I/O requests to a second VIOS providing redundant I/O coverage to the first VIOS when the first VIOS cannot complete the I/O request for the registered client LPAR. In one embodiment, this scenario may occur when the VIOS detects that a problem exists with a fabric connection to the block storage.

One or more of the above processes and/or method are implemented within a computer program product comprising: a computer readable storage medium; and program code for completing these functions stored on said computer readable storage medium.

G. Operating System Image Management

Figure 8A:
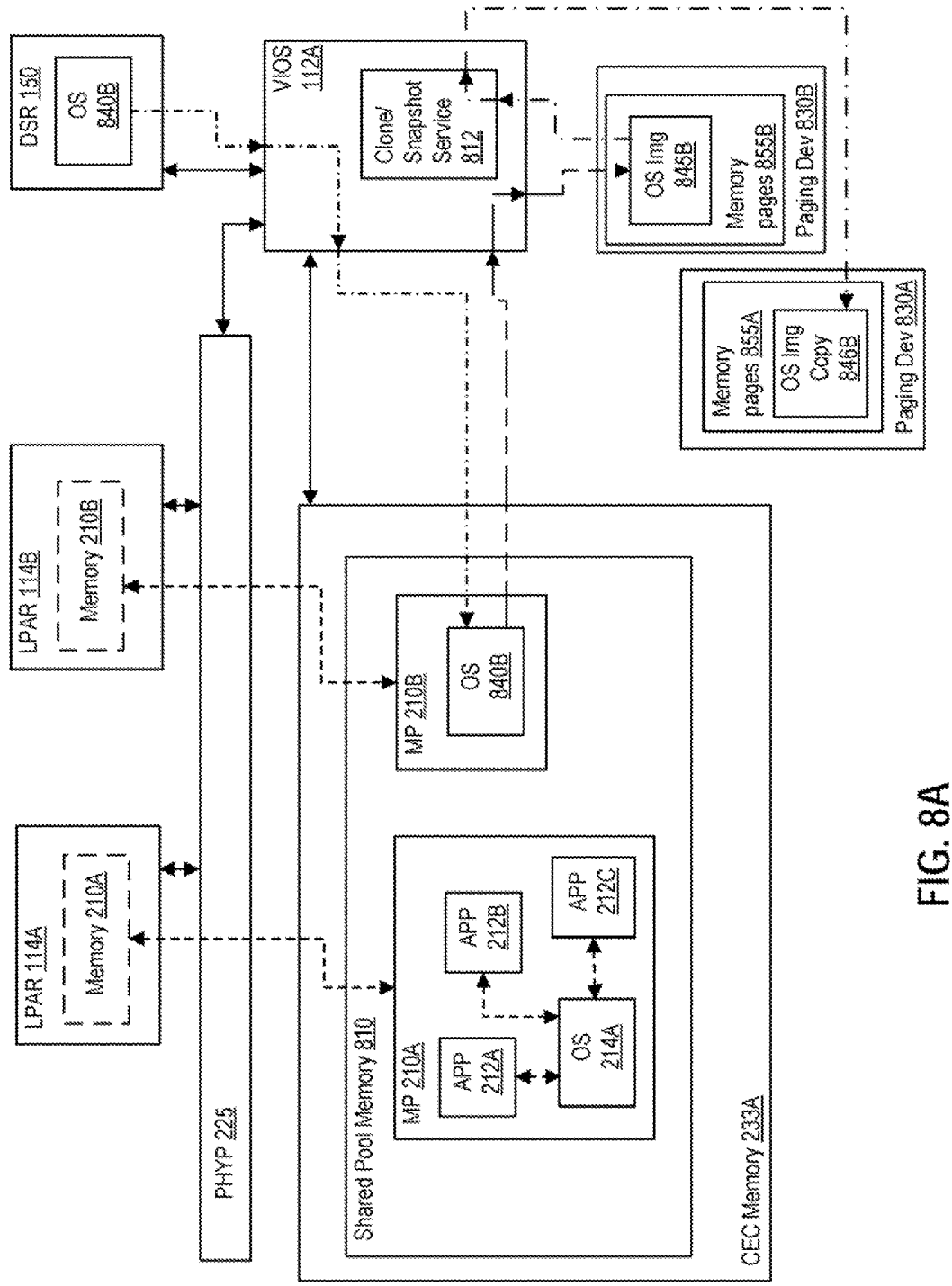
FIGS. 8A-8E are block diagrams of logical partitions and multiple operating systems are illustrated, according to one or more embodiments.
Figure 8B:
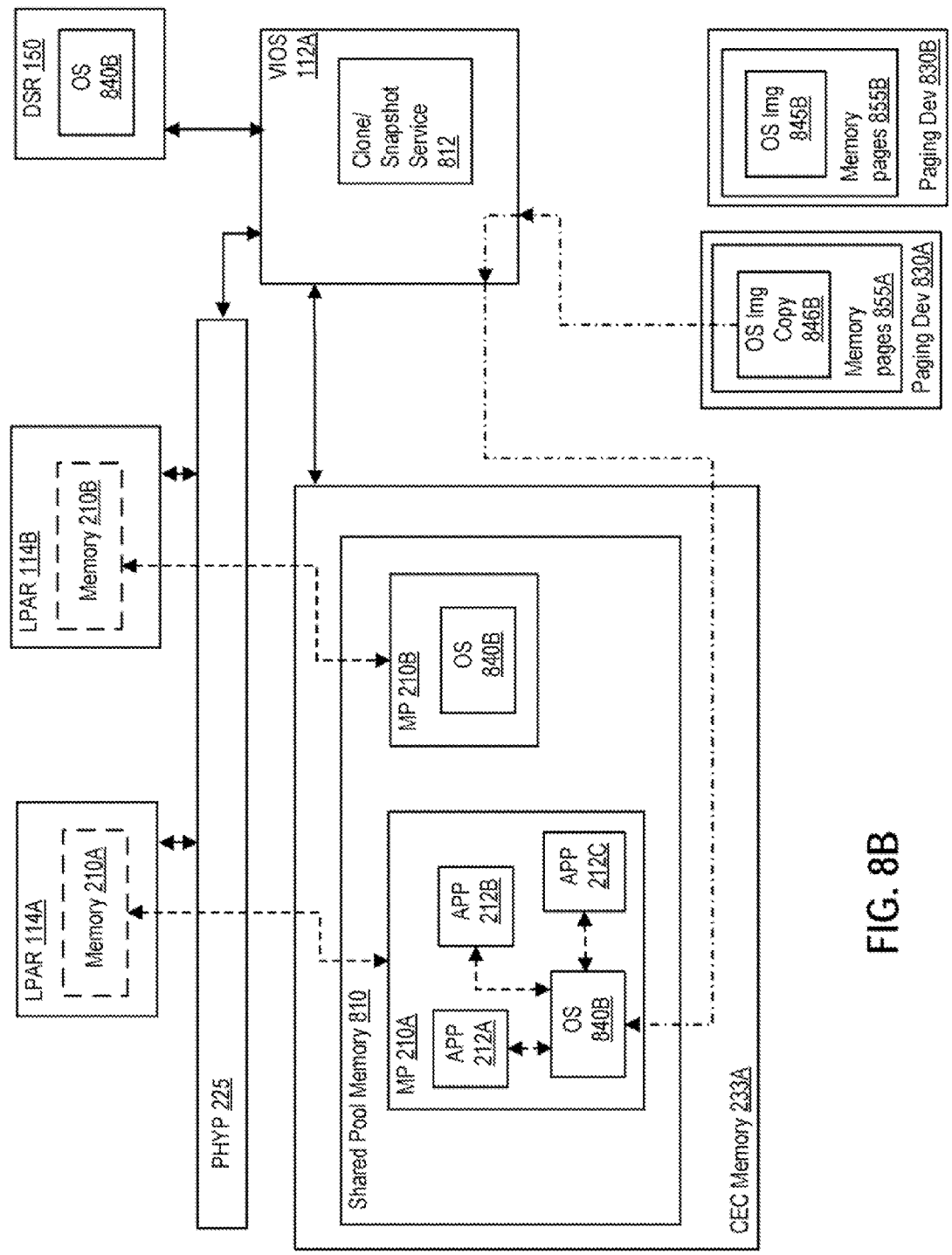

Turning now to FIGS. 8A and 8B, block diagrams of logical partitions and multiple operating systems are illustrated, according to one or more embodiments. As illustrated, VIOS 112A, LPAR 114A, and LPAR 114B are coupled to PHYP 225. In one embodiment, a CEC (e.g., CEC 110A) includes PHYP 225, VIOS 112A, LPAR 114A, and LPAR 114B. PHYP 225 can access all system memory of the CEC which allows PHYP 225 to manage and/or to control one or more images included in a memory (e.g., CEC memory 233A) of the CEC and/or included in paging devices 830A and 830B coupled to the CEC via VIOS 112A. In one example, paging devices 830A and 830B are included in distributed storage repository (DSR) 150. For example, paging devices 830A and 830B can be included in one or more of network storage 161 and physical storage 160. In one embodiment, LPAR 114B loads and/or boots OS 840B from distributed storage repository 150 into memory partition (MP) 210B that is provided by PHYP 225. For example, PHYP 225 can provide a shared pool memory 810 of CEC memory 233A to two or more LPARs. For instance, PHYP 225 provides CEC memory 233A as a shared resource to LPARs 114A and 114B.

In one or more embodiments, resource sharing allows multiple logical partitions to access a same resource under the control of PHYP 225. For example, PHYP 225 monitors load, applies allocation rules, and then time-shares access to CEC memory 233A. For instance, LPAR 114A treats the memory partition 210A as though it had complete access to shared pool memory 810 while PHYP manages the real access, avoiding conflicts or interferences, and allowing access to LPARs (e.g., LPARs 114A and 114B, etc.) that have resource requirements. Shared pool memory 810 uses paging devices 830A and 830B to store excess memory pages on storage devices. Access to paging devices 830A and 830B associated with a shared pool memory 810 is provided by a paging VIOS (e.g., VIOS 112A). As shown, shared pool memory 810 is partitioned into memory partitions 210A and 210B that correspond to LPARs 114A and 114B, respectively. In one embodiment, each shared memory partition uses a dedicated paging device. For example, a paging device is implemented as a file in distributed storage repository 150 that is provided to PHYP 225 as a vSCSI device by VIOS 112A.

When PHYP 225 needs to free memory pages in shared pool memory 810, contents of a memory partition are stored on a paging device and is restored when the contents are accessed again. For example, PHYP 225 stores, via VIOS 112A, contents of memory partition 210B on paging device 830B that includes memory pages 855B. In one embodiment, a virtual asynchronous service interface (VASI) is a virtual device conducts communications between PHYP 225 and VIOS 112A. For example, one or more VASI devices of VIOS 112A enable VIOS 112A to be a paging VIOS. Each VASI device or adapter can support multiple shared pool memories. In one embodiment, PHYP 225 includes and/or implements one or more of a VASI, a pager, and a virtual block storage device driver to provide read and/or write services between VIOS 112A and PHYP 225.

In one embodiment, an OS (e.g., OS 840B) treats the provided virtual memory (e.g., memory partition 210B) as memory 210B of the LPAR. For example, PHYP 225 provides memory partition 210B to LPAR 114B, and PHYP 225 pages out, via VIOS 112A, one or more portions of memory partition 210B to memory pages 855B of paging devices 830B. For instance, OS 840B is stored in memory partition 210B, and PHYP 225 pages out one or more portions (e.g., memory pages) of memory partition 210B of shared pool memory 810 to memory pages 855B of paging devices 830B such that one or more memory pages 855B stores OS 840B as OS image (Img) 845B.

In one or more embodiments, PHYP 225 provides and/or shares, via a paging VIOS, first memory pages of a first paging device that is associated with a first memory partition and a first LPAR with a second memory partition and a second LPAR. For example, PHYP 225 provides and/or shares, via VIOS 112A, memory pages 855B with memory partition 210A and LPAR 210A. For instance, PHYP 225, via VIOS 112A, provides one or more memory images (e.g., OS Img Copy 846B, OS Img 845B, etc.) via memory pages 855A and/or 855B to one or more of LPARs 114A and 114B and/or VIOS 112A. In one or more embodiments, providing access to one or more memory pages 855B includes providing reading and/or writing services between paging devices 830A and 830B and a LPAR or a VIOS.

As illustrated, VIOS 112A includes clone/snapshot service 812. In one or more embodiments, clone/snapshot service 812 of VIOS 112A clones OS Img 845B and/or takes a snapshot of OS Img 845B, and clone/snapshot service 812 stores a clone or a snapshot of OS Img 845B as OS Img copy 846B in memory pages 855A of paging device 830A. In one example, clone/snapshot service 812 copies both metadata and data associated with OS Img 845B and stores the copy of both metadata and data associated with OS Img 845B as OS Img copy 846B. In another example, clone/snapshot service 812 copies metadata associated with OS Img 845B and stores the copy of metadata associated with OS Img 845B as OS Img copy 846B. For instance, the copy of the metadata associated with OS Img 845B can be considered a snapshot of OS Img 845B.

In one or more embodiments, OS Img copy 846B is used by one or more LPARs. For example, PHYP 225 substitutes or redirects a portion of a memory partition or supplements the memory partition with memory pages 855A which includes OS Img copy 846B. For instance, PHYP 225 suspends operations of LPAR 114A, pages out OS 214A, and pages in OS Img copy 846B into memory partition 210A as OS 840B. After OS 840B is paged into memory partition 210A, PHYP 225 resumes operations of LPAR 114A, and LPAR 114A uses OS 840B.

As shown, memory partition 210A includes OS 214A and applications (APPs) 212A-212C that are coupled to and/or use OS 214A. In one embodiment, one or more of APPs 212A-212C are coupled to OS 214A by dynamically linking to one or more libraries (e.g., shared libraries) included in and/or provided by OS 214A. In another embodiment, one or more of APPs 212A-212C are coupled to OS 214A by communicating with one or more of a kernel, a device driver, and a logical device, among others, included in and/or provided by OS 214A.

As illustrated in FIG. 8B, OS 214A has been paged out of memory partition 210A, and OS 840B has been paged into memory partition 210A. In one embodiment, PHYP 225 replaces OS 214A with OS 840B and couples APPs 212A-212C to OS 840B while LPAR 114A is suspended. For example, application (APP) 212A can be associated with one or more pointers (e.g., memory pointers, file pointers, etc.), and PHYP 225 changes the one or more pointers to point to appropriate one or more portions of OS 840B such that APP 212A uses OS 840B. For instance, PHYP 225 replacing OS 214A with OS 840B can eliminate a restart or reboot of LPAR 114A.

In one embodiment, PHYP 225 suspends one or more of OS 214A, OS 840B, and APPs 212A-212C before replacing OS 214A with OS 840B and/or while changing pointers of an application to point to appropriate one or more portions of OS 840B. In one embodiment, data associated with OS 840B can be paged into memory partition 210A or can be made available to LPAR 114A as needed. For example, one or more portions of OS 840B can be read-only and can be shared between or among two or more LPARs. For instance, one or more of shared libraries, a kernel, and programs (e.g., init, cat, ls, ln, ksh, bash, chmod, kill, perl, python, cu, tar, touch, true, grep, nroff, rogue, vi, etc.) associated with OS 840B can be read-only and can be shared between or among two or more LPARs.

Figure 8C:
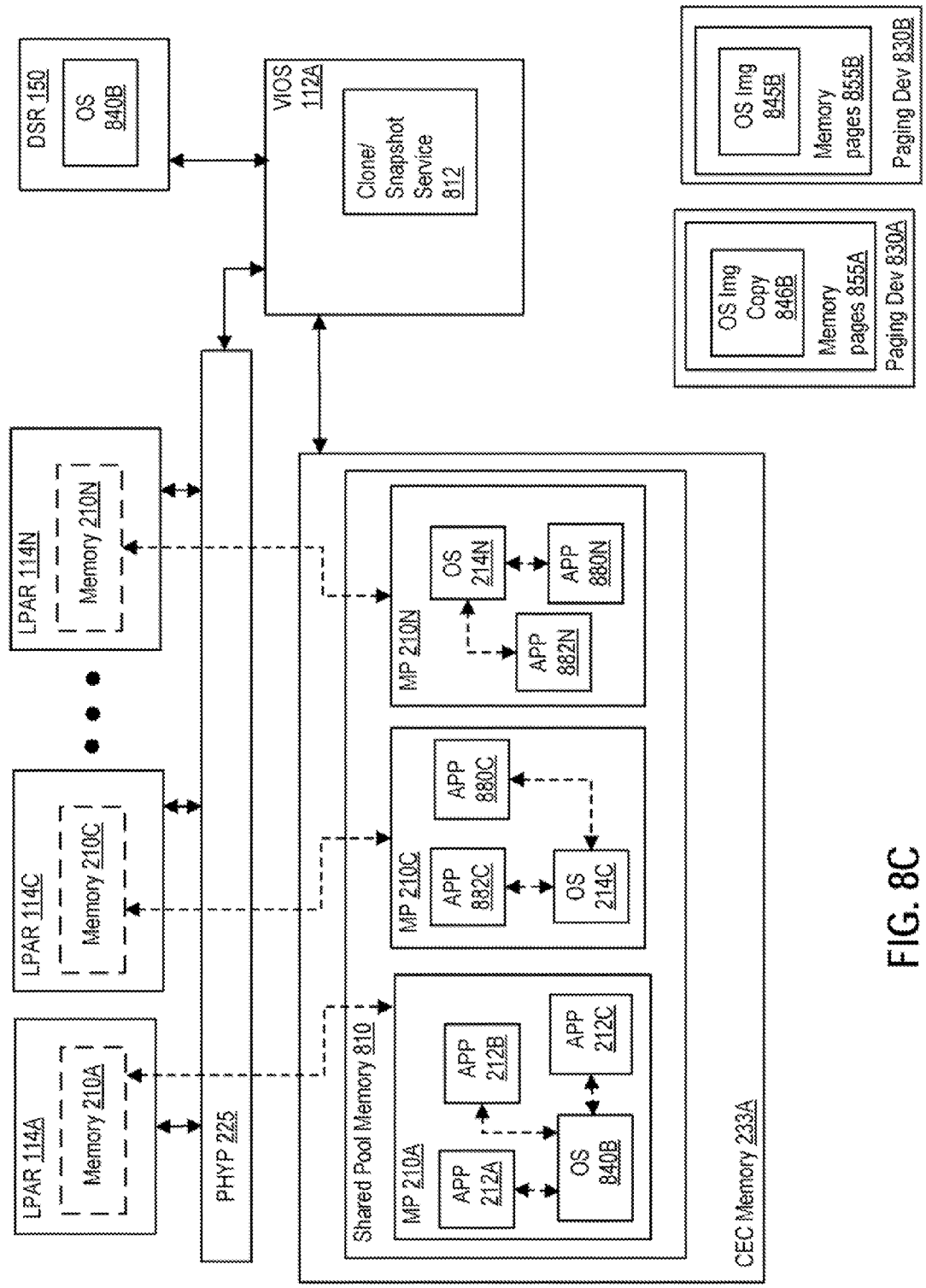
Figure 8D:
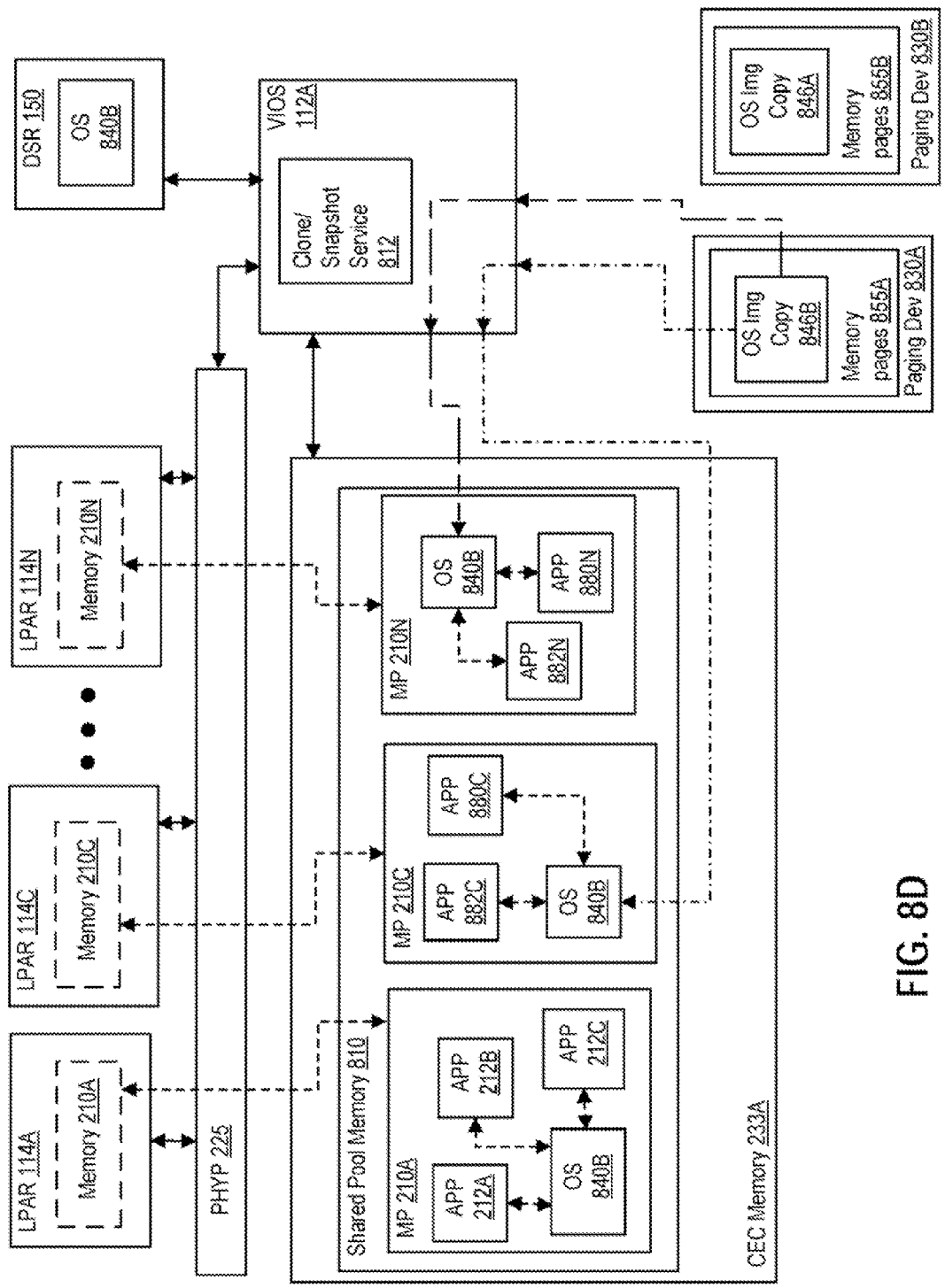

Turning now to FIGS. 8C and 8D, block diagrams of logical partitions and multiple operating systems are illustrated, according to one or more embodiments. As illustrated, VIOS 112A, LPAR 114A, and LPARs 114C-114N are coupled to PHYP 225. In one embodiment, a CEC (e.g., CEC 110A) includes VIOS 112A, LPAR 114A, LPARs 114C-114N, and PHYP 225. As is apparent in FIGS. 8C and 8D, LPAR 114B is not present. For example, LPAR 114B may be utilized to create OS Img 845B, and LPAR 114B can be removed and/or stored by PHYP 225 after OS Img 845B is created.

As shown, LPARs 114C-114N can include respective memory partitions 210C-210N which can store respective operating systems (OSes) 214C-214N. In one example, memory partition 210C can include APPs 880C and 882C which are coupled to and/or use OS 214C. In another example, memory partition 210N can include APPs 880N and 882N which are coupled to and/or use OS 214N. In one embodiment, PHYP 225 pages memory pages 855A into one or more of memories 210C-210N. In one example, OS Img copy 846B is paged into memory partition 210C as OS 840B. In another example, OS Img copy 846B is paged into memory partition 210N as OS 840B. In one embodiment, one or more of OSes 214C-214N are replaced after OS Img copy 846B has been paged into respective one or more of memory partitions 210C-210N as OS 840B.

As illustrated in FIG. 8D, OSes 212A and 210C-210N have been paged out of respective memory partitions 210A and 210C-210N, and memory pages 855A including OS Img copy 846B have been paged into memories 210C-210N as OS 840B. In one embodiment, PHYP 225 replaces OSes 214C-214N with OS 840B, couples one or more of APPs 880C and 882C to OS 840B included in memory partition 210C, and couples one or more of APPs 880N and 882N to OS 840B included in memory partition 210N. For example, APP 882N is associated with one or more pointers, and PHYP 225 changes the one or more pointers to point to appropriate one or more portions of OS 840B of memory partition 210N such that APP 882N uses OS 840B. In one embodiment, PHYP 225 suspends one or more of OS 214N, OS 840B, and APPs 880N and 882N before replacing OS 214N with OS 840B and/or while changing pointers of an application to point to appropriate one or more portions of OS 840B.

Figure 8E:
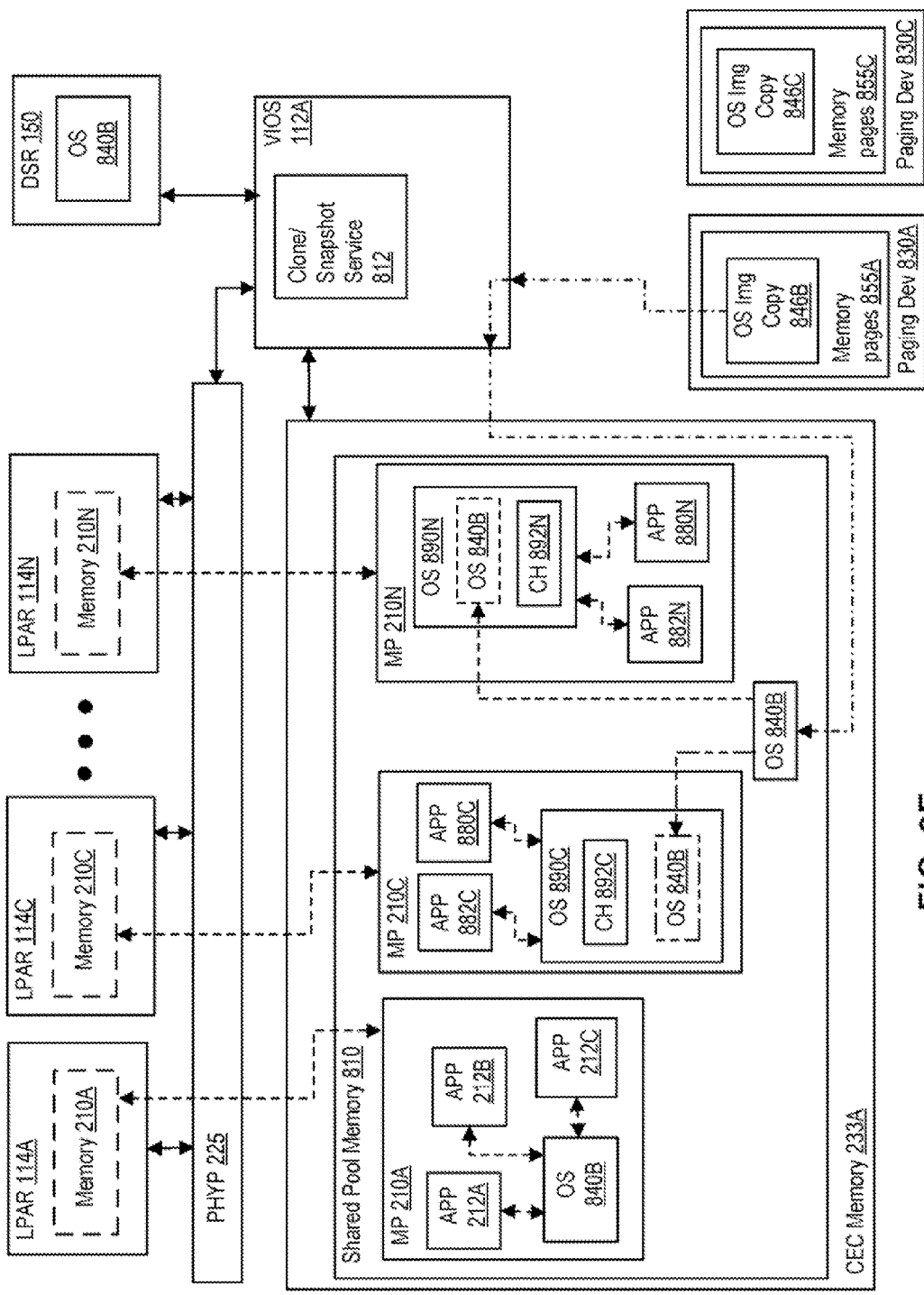

Turning now to FIG. 8E, a block diagram of logical partitions and multiple operating systems are illustrated, according to one or more embodiments. As illustrated, memory pages 855A including OS Img copy 846B have been paged into shared pool memory 810 as OS 840B. In one embodiment, PHYP 225 provides read-only access of OS 840B to memory partitions 210C-210N that can be used within with respective OSes 890C-890N. As shown, PHYP 225 replaces OSes 214C-214N with respective OSes 890C-890N, couples one or more of APPs 880C and 882C to OS 890C included in memory partition 210C, and couples one or more of APPs 880N and 882N to OS 890N included in memory partition 210N. As illustrated, OS 890C includes changes (CH) 892C and a read-only accessible link to OS 840B, and OS 890N includes CH 892C and a read-only accessible link to OS 840B.

In one or more embodiments, an OS (e.g., OS 890C) accesses a shared copy of an OS image (e.g., OS Img Copy 846B) and includes metadata changes and data changes (e.g., CH 892C) differing from the OS image that are local or specific to a LPAR (e.g., LPAR 114C). In one example, OS 890C includes OS 840B that is shared between or among two or more LPARs and can include CH 892C which includes metadata changes and data changes differing from OS 840B that are local or specific to LPAR 114C. In another example, OS 890N includes OS 840B that is shared between or among two or more LPARs and includes CH 892N which includes metadata changes and data changes differing from OS 840B that are local or specific to LPAR 114N. In one embodiment, OSes 890C and 890N can be respectively produced from a combination of a shared read-only link to OS 840B and CH 892C and from a combination the shared read-only link to OS 840B and CH 892N.

The one or more changes in metadata and/or data differing from a shared OS image can include one or more of a network address, a network mask, a default gateway, a mount point, an initialization script or utility, a users file (e.g., /etc/passwd), a group file (e.g., /etc/group), a device driver, a loadable kernel module, a kernel parameter, and a library, among others. For example, one or more of LPAR 114C, VOIS 112A, and PHYP 225 modifies OS 890C with the one or more changes in metadata and/or data differing from OS 840B. For instance, VIOS 112A receives a write request to modify a portion of OS 890C with a modification and/or change and performs a redirection-on-write action, method, or process to store the modification and/or change to OS 890C in CH 892C.

As illustrated, memory pages 855C of paging device 830C include OS Img copy 846C. For example, each of OS Img copies 846B and 846C can be different from another. In one or more embodiments, OS Img copy 846C is produced and/or used in a same or similar fashion as OS Img copy 846B.

Figure 9:
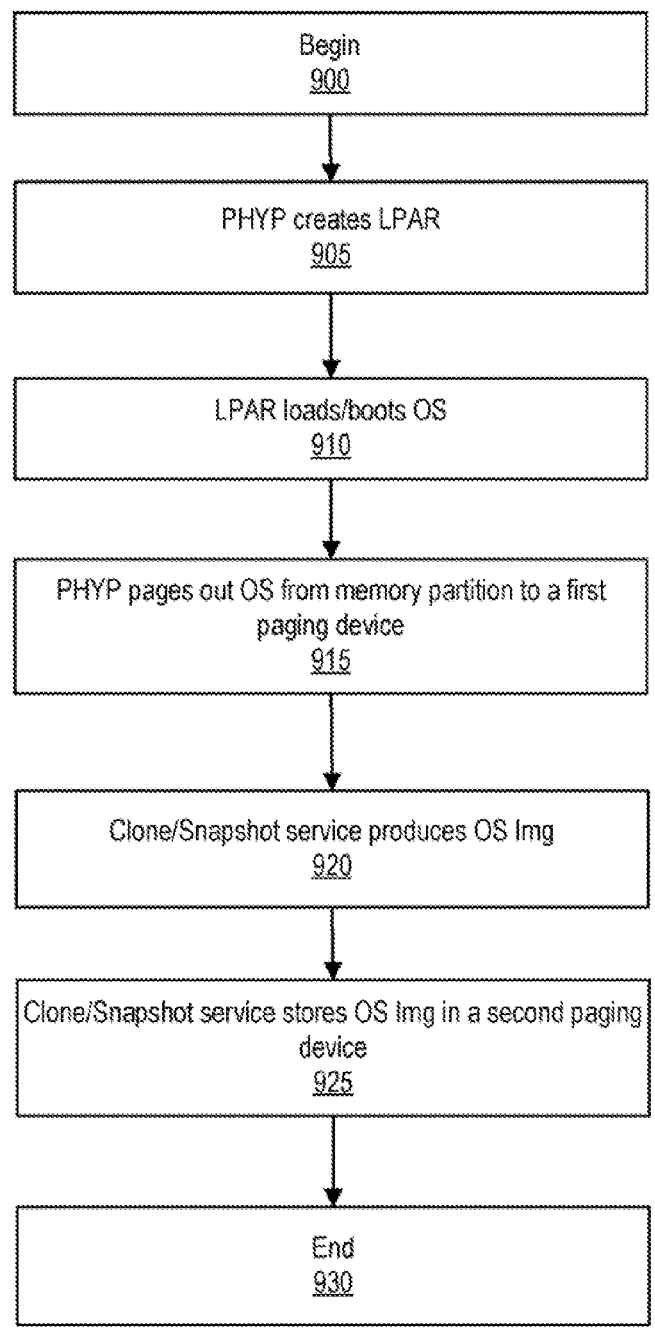
FIG. 9 provides a method of producing an operating system image, according to one or more embodiments.

Turning now to FIG. 9, a method of producing an operating system image is illustrated, according to one or more embodiments. The method begins at block 900 and proceeds to block 905 where PHYP 225 creates LPAR 114B. In one embodiment, LPAR 114B is a hidden client LPAR. For example, other client LPARs are not able to communicate with and/or control LPAR 114B.

At block 910, LPAR 114B loads and/or boots OS 840B from distributed storage repository 150. At block 915, PHYP 225 pages out OS 840B from memory partition 210B to memory pages 855B of paging device 830B as OS Img 845B. In one embodiment, storing OS 840B via memory pages 855B creates and/or produces an image of OS 840B that can be paged into another memory partition.

At block 920, clone/snapshot service 812 of VIOS 112A produces OS Img copy 846B. In one embodiment, producing OS Img copy 846B clone/snapshot service 812 includes cloning OS Img 845B and/or taking a snapshot of OS Img 845B. In one example, clone/snapshot service 812 copies both metadata and data associated with OS Img 845B and stores the copy of both metadata and data associated with OS Img 845B as OS Img copy 846B in memory pages 855A of paging device 830A. In another example, clone/snapshot service 812 copies metadata associated with OS Img 845B and stores the copy of metadata associated with OS Img 845B as OS Img copy 846B in memory pages 855A of paging device 830A. For instance, the copy of the metadata associated with OS Img 845B is considered a snapshot of OS Img 845B. At block 925, clone/snapshot service 812 stores a clone (e.g., duplication) or a snapshot of OS Img 845B as OS Img copy 846B in memory pages 855A of paging device 830A. The method then ends at block 930.

Figure 10:
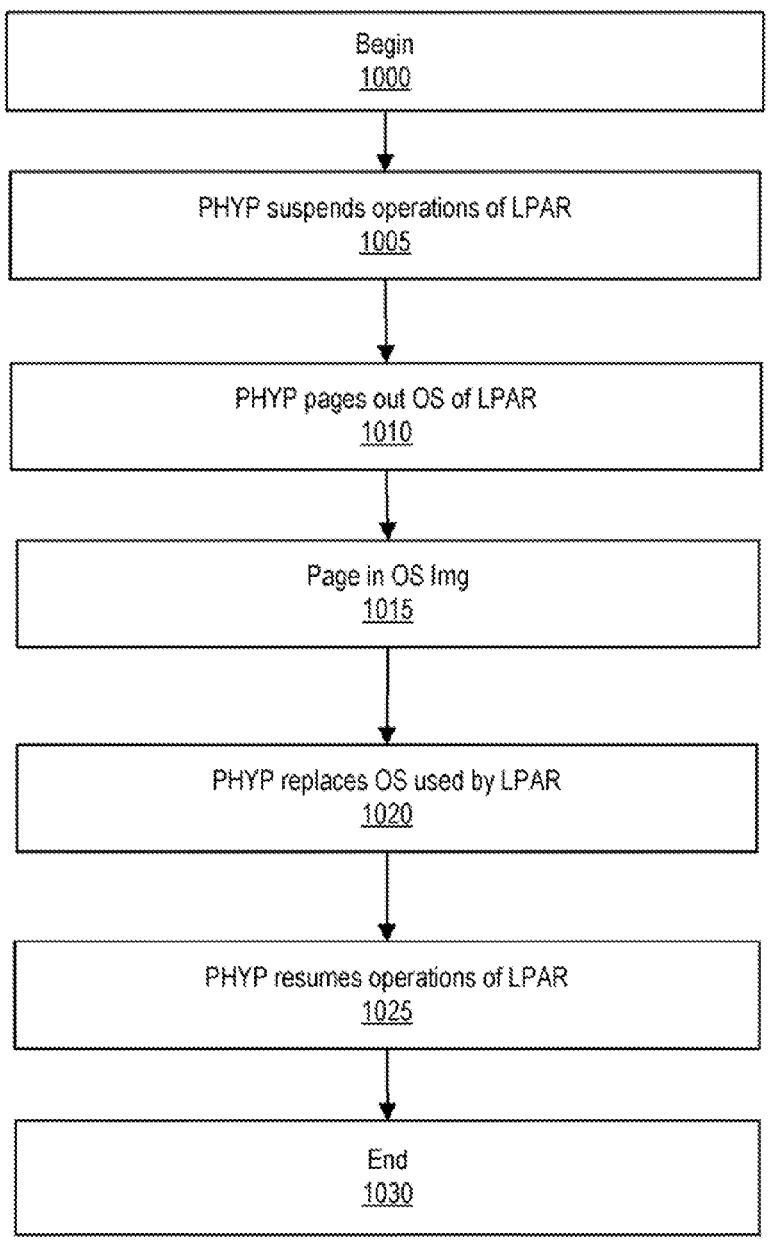
FIG. 10 provides a method of replacing an operating system, according to one or more embodiments.

Turning now to FIG. 10, a method of replacing an operating system is illustrated, according to one or more embodiments. The method begins at block 1000 and proceeds to block 1005 where PHYP 225 suspends operations of LPAR 114A. In one embodiment, suspending one or more operations of LPAR 114A includes suspending one or more of OS 214A and APPs 212A-212C. At block 1010, PHYP 225 pages out OS 214A. At block 1015, PHYP 225 pages in OS Img copy 846B into memory partition 210A associated with LPAR 114A. In one embodiment, PHYP 225 pages in OS Img copy 846B from pages 855A of paging device 830A. In one embodiment, paging in OS Img copy 846B includes paging in metadata associated with OS 840B. For example, PHYP 225 pages in metadata associated with OS 840B and data associated with OS 840B is paged in at a later point in time or as the data is needed or required.

At block 1020, PHYP 225 changes one or more pointers of each of APPs 212A-212C to point to appropriate one or more portions of OS 840B such that APPs use 212A-212C OS 840B. At block 1025, PHYP 225 resumes one or more suspended operations of LPAR 114A. For example, one or more of APPs 212A-212C resume operations and/or execution using OS 840B. The method then ends at block 1030. In one or more embodiments, the method illustrated in FIG. 10 can be repeated for one or more other LPARs and/or other OS images. In one example, the method illustrated in FIG. 10 can be repeated for one or more of LPARs 114C-114N. In another example, the method illustrated in FIG. 10 can be repeated for OS Img copy 846C.

Figure 11:
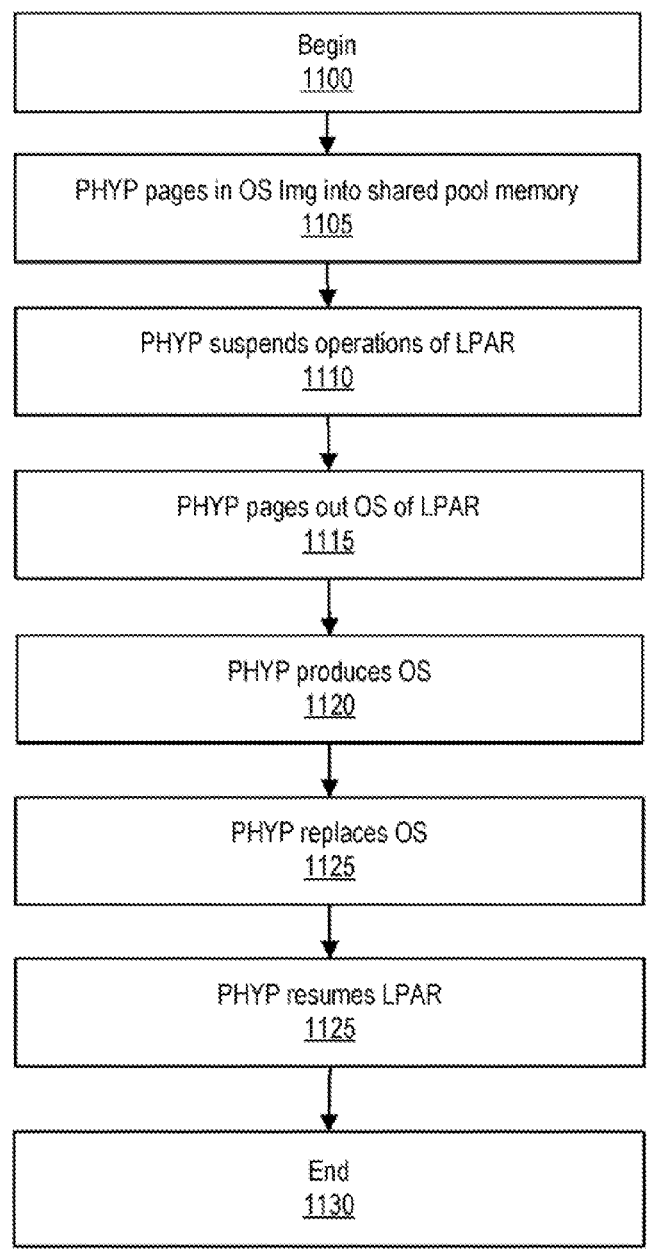
FIG. 11 provides another method of replacing an operating system, according to one or more embodiments.

Turning now to FIG. 11, a method of replacing an operating system is illustrated, according to one or more embodiments. The method begins at block 1100 and proceeds to block 1105 where PHYP 225 pages in OS Img copy 846B into shared pool memory 810. In one embodiment, PHYP 225 pages in OS Img copy 846B from memory pages 855A of paging device 830A. In another embodiment, paging in OS Img copy 846B includes paging in metadata associated with OS 840B. For example, PHYP 225 pages in metadata associated with OS 840B and data associated with OS 840B is paged in at a later point in time or as the data is needed or required. In one embodiment, the data associated with OS 840B is paged in as read-only data. For example, OS Img copy 846B is shared between or among two or more LPARs. For instance, OS Img copy 846B is shared between LPARs 114C and 114N.

At block 1110, PHYP 225 suspends operations of LPAR 114C. At block 1115, PHYP 225 pages out OS 214C of LPAR 114C. In one embodiment, suspending one or more operations of LPAR 114C can include suspending one or more of OS 214C and APPs 880C and 882C. At block 1120, PHYP 225 produces OS 890C from OS 840B and CH 892C, where CH 892C can include metadata changes and data changes differing from OS 840B that are local or specific to LPAR 114C. In one embodiment, CH 892C does not include any changes until a redirect-on-write operation occurs, where CH 892C stores metadata changes and data changes differing from OS 840B when a write operation to modify OS 890C is redirected.

At block 1125, PHYP 225 replaces OS 214C with OS 890C. In one embodiment, replacing OS 214C with OS 890C includes coupling APPs 880C and 882C to OS 890C. For example, APPs 880C-882C are coupled to OS 890C such that APPs 880C and 882C uses OS 890C. In one embodiment, an APP (e.g., APP 880C) is associated with one or more pointers, and PHYP 225 changes the one or more pointers to point to appropriate one or more portions of OS 890C such that the APP uses OS 890C. At block 1130, PHYP 225 resumes one or more suspended operations of LPAR 114C. For example, one or more of APPs 880C and 882C resume operations and/or execution using OS 890C. The method then ends at block 1135. In one or more embodiments, the method illustrated in FIG. 11 can be repeated for one or more other LPARs. For example, the method illustrated in FIG. 11 can be repeated for one or more of LPARs 114A-114N.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system including: a processor, a memory coupled to the processor, at least one virtual I/O server (VIOS) that enables communications with a plurality of paging devices, a plurality of logical partitions, and a virtualization management component executing within the data processing system and controlling one or more operations of the plurality of logical partitions, a method comprising:

- executing, on a first logical partition of the plurality of logical partitions, an application that uses a first operating system stored in a first memory partition of a shared pool memory of the memory coupled to the processor, wherein the first logical partition uses the first memory partition as a first memory of the first logical partition;
- initiating an update process that quiesces execution of the application;
- paging in, via the VIOS coupled to a first paging device of the plurality of paging devices, a first image of a second operating system from the first paging device to the shared pool memory;
- changing one or more pointers associated with the application to point to one or more portions of the second operating system; and
- resuming execution of the application, wherein the application uses the second operating system.

2. The method of claim 1, further comprising:
- creating a second logical partition within the plurality of logical partitions;
- loading the second operating system into a second memory partition of the shared pool memory, wherein the second logical partition uses the second memory partition as a second memory of the second logical partition;
- paging out, via the VIOS coupled to a second paging device of the plurality of paging devices, a second image of the second operating system; and
- producing the first image of the second operating system by copying one or more of data and metadata associated with the second operating system to the first image.

3. The method of claim 2, wherein:
- copying the metadata associated with the second operating system to the first image include taking a snapshot of the second operating system to produce the metadata; and
- paging in, via the VIOS coupled to the first paging device of the plurality of paging devices, the first image of the second operating system from the first paging device to the first memory partition includes paging in the metadata from the snapshot of the second operating system.

4. The method of claim 1, wherein:
- the first paging device is associated with a file in a file system; and
- the VIOS provides, via a virtual small computer system interface (SCSI) device, the file to the virtualization management component as the first paging device.

5. The method of claim 1, wherein paging in, via the VIOS coupled to the first paging device, the first image of the second operating system from the first paging device to the shared pool memory includes paging in the first image of the second operating system from the first paging device to a first memory partition of the shared pool memory.

6. The method of claim 1, further comprising one or more of:
- producing a third operating system that includes the first image of the second operating system, first metadata changes, and first data changes differing from the first image of the second operating system that are specific to a second logical partition; and
- producing a fourth operating system that includes the first image of the second operating system, second metadata changes, and second data changes differing from the first image of the second operating system that are specific to a third logical partition.

7. The method of claim 6, further comprising:
- receiving a write request to modify the third operating system with a modification; and
- performing a redirection-on-write process to modify one or more of the first metadata changes and the first data changes with the modification.

8. The method of claim 1, further comprising:
- providing read and write services between the VIOS and the virtualization management component via one or more of a virtual asynchronous service interface, a pager, and a virtual block storage device driver.

9. A computing electronic complex comprising:
- a processor;
- one or more physical input/output (I/O) adapters coupled to the processor and which support I/O communication with a distributed storage repository; and
- a memory coupled to the processor, wherein the memory includes:
  - a virtualization management component that supports creation of and communication between a plurality of logical partitions and that executes to perform functions of:
    - executing, on a first logical partition of the plurality of logical partitions, an application that uses a first operating system stored in a first memory partition of a shared pool memory of the memory coupled to the processor, wherein the first logical partition uses the first memory partition as a first memory of the first logical partition;
    - initiating an update process that quiesces execution of the application;
    - paging in, via the VIOS coupled to a first paging device of the plurality of paging devices, a first image of a second operating system from the first paging device to the shared pool memory;
    - changing one or more pointers associated with the application to point to one or more portions of the second operating system; and
    - resuming execution of the application, wherein the application uses the second operating system; and
  - the VIOS performing the functions of:
    - communicating with the distributed storage repository to access a plurality of files of the distributed storage repository; and
    - providing the plurality of files in the distributed storage repository as the plurality of paging devices to the virtualization management component.

10. The computing electronic complex of claim 9, wherein the virtualization management component further provides functions of:
- creating a second logical partition within the plurality of logical partitions;
- loading the second operating system into a second memory partition of the shared pool memory, wherein the second logical partition uses the second memory partition as a second memory of the second logical partition;
- paging out, via the VIOS coupled to a second paging device of the plurality of paging devices, a second image of the second operating system; and
- producing the first image of the second operating system by copying one or more of data and metadata associated with the second operating system to the first image.

11. The computing electronic complex of claim 10, wherein:
producing the first image of the second operating system includes taking a snapshot of the second operating system to produce the metadata; and
paging in, via the VIOS coupled to the first paging device of the plurality of paging devices, the first image of the second operating system from the first paging device to the first memory partition includes paging in the metadata from the snapshot of the second operating system.

12. The computing electronic complex of claim 8, wherein paging in, via the VIOS coupled to the first paging device, the first image of the second operating system from the first paging device to the shared pool memory includes paging in the first image of the second operating system from the first paging device to a first memory partition of the shared pool memory.

13. The computing electronic complex of claim 8, wherein the virtualization management component further provides functions of:
producing a third operating system that includes the first image of the second operating system, first metadata changes, and first data changes differing from the first image of the second operating system that are specific to a second logical partition; and
producing a fourth operating system that includes the first image of the second operating system, second metadata changes, and second data changes differing from the first image of the second operating system that are specific to a third logical partition.

14. The computing electronic complex of claim 13, wherein the virtualization management component further provides functions of:
receiving a write request to modify the third operating system with a modification; and
performing a redirection-on-write process to modify one or more of the first metadata changes and the first data changes with the modification.

15. The computing electronic complex of claim 8, wherein the memory includes a virtual asynchronous service interface component that supports communication between the virtualization management component and the VIOS.

16. A computer program product comprising:
a non-transitory computer readable storage medium; and
program code on the non-transitory computer readable storage medium that when executed by a processor within a data processing system performs functions of:
executing, on a first logical partition of the plurality of logical partitions, an application that uses a first operating system stored in a first memory partition of a shared pool memory of the memory coupled to the processor, wherein the first logical partition uses the first memory partition as a first memory of the first logical partition;
initiating an update process that quiesces execution of the application;
paging in, via the VIOS coupled to a first paging device of the plurality of paging devices, a first image of a second operating system from the first paging device to the shared pool memory;
changing one or more pointers associated with the application to point to one or more portions of the second operating system; and
resuming execution of the application, wherein the application uses the second operating system.

17. The computer program product of claim 16, wherein the program code comprises code that when executed by the processor within the data processing system further performs functions of:
creating a second logical partition within the plurality of logical partitions;
loading the second operating system into a second memory partition of the shared pool memory, wherein the second logical partition uses the second memory partition as a second memory of the second logical partition;
paging out, via the VIOS coupled to a second paging device of the plurality of paging devices, a second image of the second operating system; and
producing the first image of the second operating system by copying one or more of data and metadata associated with the second operating system to the first image.

18. The computer program product of claim 16, wherein the program code for producing the first image of the second operating system by copying metadata associated with the second operating system to the first image includes program code for copying data associated with the second operating system to the first image.

19. The computer program product of claim 16, wherein the program code comprises code that when executed by the processor within the data processing system further performs functions of:
producing a third operating system that includes the first image of the second operating system, first metadata changes, and first data changes differing from the first image of the second operating system that are specific to a second logical partition; and
producing a fourth operating system that includes the first image of the second operating system, second metadata changes, and second data changes differing from the first image of the second operating system that are specific to a third logical partition.

20. The computer program product of claim 19, wherein the program code comprises code that when executed by the processor within the data processing system further performs functions of:
receiving a write request to modify the third operating system with a modification; and
performing a redirection-on-write process to modify one or more of the first metadata changes and the first data changes with the modification.

* * * * *